(12) United States Patent
Fujitsuka et al.

(10) Patent No.: US 9,765,977 B2
(45) Date of Patent: Sep. 19, 2017

(54) HEAT-ACCUMULATING HOT-WATER-SUPPLYING AIR CONDITIONER

(75) Inventors: Masashi Fujitsuka, Tokyo (JP); Hiroshi Enomoto, Tokyo (JP); Motohiko Kawagishi, Tokyo (JP); Kazuhiko Kawajiri, Tokyo (JP); Minoru Sato, Tokyo (JP); Shunkei Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1065 days.

(21) Appl. No.: 13/496,245

(22) PCT Filed: Sep. 28, 2010

(86) PCT No.: PCT/JP2010/066767
§ 371 (c)(1),
(2), (4) Date: Mar. 15, 2012

(87) PCT Pub. No.: WO2011/040387
PCT Pub. Date: Apr. 7, 2011

(65) Prior Publication Data
US 2012/0180984 A1    Jul. 19, 2012

(30) Foreign Application Priority Data

Sep. 29, 2009  (JP) .................................. 2009-223759

(51) Int. Cl.
*F24D 11/00*    (2006.01)
*F24D 11/02*    (2006.01)
(Continued)

(52) U.S. Cl.
CPC ...... *F24D 11/0214* (2013.01); *F24D 19/1039* (2013.01); *F24F 5/0017* (2013.01);
(Continued)

(58) Field of Classification Search
CPC .............. F24D 11/0214; F24D 19/1039; F24F 5/0007; F24F 5/0017; Y02B 30/126; Y02E 60/147; F25B 49/027
(Continued)

(56) References Cited

U.S. PATENT DOCUMENTS 4,545,214 A * 10/1985 Kinoshita ............... F24D 11/02
62/160
4,738,305 A *  4/1988 Bacchus ................. F24D 17/02
126/629

(Continued)

FOREIGN PATENT DOCUMENTS

EP    1 614 980 A2    1/2006
JP    10-82537         3/1998
(Continued)

OTHER PUBLICATIONS

JP2004218909—Machine Translation.*

*Primary Examiner* — Len Tran
*Assistant Examiner* — Gustavo Hincapie Serna
(74) *Attorney, Agent, or Firm* — Oblon, McClelland, Maier & Neustadt, L.L.P.

(57) ABSTRACT

A first circulation channel connects a first heat demand part and first supply heat exchanger with its forward route and return route. Supply and discharge channels are connected to a first heat accumulation tank, which accommodates a second heat medium heated in the first supply heat exchanger and supplied via the supply channel. A heat accumulation switching valve changes over communication of the second heat medium serving as hot heat or cold heat flowing from the first supply heat exchanger and supplied to the first heat demand part without branching to the supply channel or branching to the supply channel and supplied to the first heat accumulation tank. A heat-accumulating hot-water-supplying air conditioner operates at a first tempera-
(Continued)

ture when the second heat medium from the first supply heat exchanger branches to the supply channel, and at a second lower temperature when the second heat medium does not branch to the supply channel.

13 Claims, 12 Drawing Sheets

(51) Int. Cl.
- F24F 5/00 (2006.01)
- F24D 19/10 (2006.01)
- F25B 13/00 (2006.01)
- F25B 25/00 (2006.01)

(52) U.S. Cl.
CPC ............ *F24F 5/0096* (2013.01); *F25B 13/00* (2013.01); *F25B 25/005* (2013.01); *F24F 2005/0025* (2013.01); *F24F 2221/183* (2013.01); *F24F 2221/54* (2013.01); *F25B 2313/02741* (2013.01); *F25B 2400/24* (2013.01); *Y02B 30/126* (2013.01); *Y02E 60/147* (2013.01)

(58) Field of Classification Search
USPC .......... 165/236, 240, 241; 62/160, 181, 183, 62/201; 236/35 R
See application file for complete search history.

(56) References Cited

U.S. PATENT DOCUMENTS

| | | | | |
|---|---|---|---|---|
| 4,878,357 A | * | 11/1989 | Sekigami | F24F 3/065 62/160 |
| 5,400,609 A | * | 3/1995 | Sjoholm | F25B 27/00 62/113 |
| 5,628,200 A | * | 5/1997 | Pendergrass | F24F 3/06 62/197 |
| 2002/0035843 A1 | * | 3/2002 | Kampf | B60H 1/00328 62/231 |
| 2002/0108745 A1 | * | 8/2002 | Kimura | B60H 1/025 165/236 |
| 2005/0262870 A1 | * | 12/2005 | Narayanamurthy et al. | ... 62/434 |
| 2006/0150652 A1 | * | 7/2006 | Choi | F25B 13/00 62/238.6 |
| 2006/0185376 A1 | * | 8/2006 | Yoshimi | F25B 13/00 62/228.1 |
| 2006/0218948 A1 | * | 10/2006 | Otake | F25B 9/008 62/160 |
| 2007/0246555 A1 | * | 10/2007 | Nishimura et al. | ........... 237/2 B |
| 2008/0023961 A1 | * | 1/2008 | Cho | F25B 27/02 290/2 |
| 2008/0034760 A1 | * | 2/2008 | Narayanamurthy et al. | ...... 62/59 |
| 2009/0113911 A1 | * | 5/2009 | Nakayama | F24D 17/02 62/238.6 |
| 2009/0211282 A1 | * | 8/2009 | Nishimura | F24D 17/02 62/238.6 |
| 2009/0293507 A1 | * | 12/2009 | Narayanamurthy et al. | ...... 62/59 |

FOREIGN PATENT DOCUMENTS

| | | | | |
|---|---|---|---|---|
| JP | 2003-307325 | | 10/2003 | |
| JP | 2004-218909 | * | 5/2004 | ............... F24D 3/08 |
| JP | 2004-218909 | | 8/2004 | |
| JP | 2004-232978 | | 8/2004 | |
| JP | 2004218909 A | * | 8/2004 | |
| JP | 2005-133984 | | 5/2005 | |
| JP | 2006-17363 | | 1/2006 | |
| JP | 2006-23006 | | 1/2006 | |
| JP | 2007-10288 | | 1/2007 | |
| JP | 2007 205586 | * | 8/2007 | ............... F24H 1/00 |
| JP | 2007-205586 | | 8/2007 | |
| JP | 2008-20100 | | 1/2008 | |
| JP | 2008-76048 | | 4/2008 | |
| JP | 2008-128587 | | 6/2008 | |
| JP | 2009-133541 | | 6/2009 | |
| JP | 2009 133541 | * | 6/2009 | ............... F24H 1/00 |
| JP | 2009-250542 | | 10/2009 | |

\* cited by examiner

HEAT-ACCUMULATING HOT-WATER-SUPPLYING AIR CONDITIONER

TECHNICAL FIELD

The present invention relates to a heat-accumulating hot-water-supplying air conditioner (heat accumulating device) which supplies hot water and performs air conditioning (room cooling and heating) using the accumulated heat by, for example, a heat pump mechanism.

BACKGROUND ART (Prior Art 1)
Conventionally, a heat accumulating device is known in which hot heat or cold heat from a heat source device is accumulated in a heat accumulation tank by a heat medium, and hot heat or cold heat accumulated in the heat accumulation tank is supplied via the heat medium to a load unit that utilizes hot heat or cold heat (see, for example, Patent Literature 1).

Claim 1 of Patent Literature 1 describes "a heat accumulating device comprising: a heat accumulation tank which accommodates a heat accumulator formed by sealing in a capsule a heat accumulating material which accumulates heat by utilizing a latent heat, thereby accumulating hot heat or cold heat; a heat-receiving heat medium supply path which supplies a heat medium having hot heat or cold heat, from a heat source unit to the heat accumulation tank; a heat-supplying heat medium supply path which supplies hot heat or cold heat from the heat accumulation tank to a load unit through the heat medium; a heat medium bypass circulation path configured to flow the heat medium into the heat accumulation tank in a direction coinciding with a direction in which the heat medium, flowing to the load unit through the heat-supplying heat medium supply path, flows inside the heat accumulation tank, and to flow the heat medium by bypassing the load unit; and a heat medium circulating pump unit provided to the heat medium bypass circulation path." According to Patent Literature 1, this heat accumulating device achieves improvement in heat transfer of the heat accumulator and heat medium in the heat accumulation tank and decrease in temperature of the heat medium flowing into the heat accumulation tank simultaneously. As a result, according to Patent Literature 1, a large quantity of heat may be supplied per unit time to the load unit without operating a heat source device.

(Prior Art 2)
A heat accumulation system is conventionally known which includes a plurality of heat accumulation tanks for accumulating, according to usages, heat media heated by a heat source, and a heat exchange means, for exchanging heat among the plurality of heat accumulation tanks (see, for example, Patent Literature 2).

According to Patent Literature 2, as in its abstract, "a room-heating heat accumulation tank and a heat source are connected to each other via a circulation circuit, and room-heating hot water from the heat source is stored in the room-heating heat accumulation tank. The circulation circuit is connected to a room-heating circuit mounted with a heat radiator, and room heating is performed using the room-heating hot water from the room-heating heat accumulation tank. The circulation circuit is connected to a hot-water-supplying heat exchange circuit mounted with a hot-water-supplying heat exchanger, and a bathtub heat exchange circuit mounted with a bathtub heat exchanger. The hot-water-supplying heat exchanger is connected to a hot-water-supplying circulation circuit mounted with a hot-water accumulation tank, and hot water is reserved in the hot-water-supplying heat accumulation tank. The hot-water-supplying circulation circuit is connected to a hot-water supply circuit, and hot water is supplied. The bathtub heat exchanger is connected to a bathtub circuit, and hot water in a bathtub is heated. When hot-water-supplying hot water in the hot-water-supplying heat accumulation tank is consumed, this shortage is backed up by the heat of the room-heating hot water from the room-heating heat accumulation tank". According to Patent Literature 2, because of this heat accumulation system, even when heat quantity shortage occurs in individual heat accumulation tanks, the heat quantity may be supplemented by a heat exchange means. Hence, according to Patent Literature 2, an increase in size of the individual heat accumulation tanks may be avoided, so the heat accumulation tanks may be downsized, allowing installation of the heat accumulation system at a narrow place and initial cost reduction.

CITATION LIST

Patent Literature

Patent Literature 1: JP 10-82537
Patent Literature 2: JP 2005-133984

SUMMARY OF INVENTION

Technical Problem

According to Prior Art 1 (Patent Literature 1), heat from a heat source unit is temporarily accumulated in the heat accumulation tank, and the heat accumulated in the heat accumulation tank is supplied to the load unit that utilizes heat. In Prior Art 1 (Patent Literature 1), when hot heat is accumulated in the heat accumulation tank, cold heat cannot be supplied to the load unit (room cooling cannot be performed).

Inversely, when cold heat is accumulated in the heat accumulation tank, hot heat cannot be supplied to the load unit (room heating cannot be performed). In this prior art, heat is utilized by the load unit only in the form of either hot heat or cold heat. Even if a plurality of load units are connected in parallel, hot water supply utilizing hot heat and room cooling utilizing cold heat cannot be performed simultaneously. This is inconvenient.

The basic structure of Prior Art 2 (Patent Literature 2) is the same as that of Prior Art 1. If attempted, it might be possible to temporarily accumulate hot heat in the room-heating heat accumulation tank so as to accumulate hot heat in the hot-water-supplying heat accumulation tank by heat exchange, and thereafter accumulate cold heat in the room-heating heat accumulating tank, so room cooling by a heat radiator and hot water supply by a hot-water-supplying heat accumulation tank may be performed simultaneously. However, a large amount of energy is wasted when the hot heat temporarily stored in the room-heating heat accumulation tank is switched to the cold heat. Also, room cooling and bathtub reheating cannot be performed simultaneously after all.

Depending on the quality of the water supplied, various kinds of minor germs may proliferate in the hot-water-supplying heat accumulation tank by low-temperature heat accumulation, and scale formation may be promoted by hot-temperature heat accumulation.

Assume that hot heat is accumulated in the heat accumulation tank. If there are a plurality of load units in Prior Art 1, or if room heating, bathtub reheating, or hot water supply is to be performed in Prior Art 2, heat is accumulated in the heat accumulation tank at the highest necessary temperature (room heating heat temperature is lower than the heat temperature for hot water supply or for reheating). Hence, the higher the temperature required, the lower the efficiency of the heat pump mechanism serving as the heat source.

It is an object of the present invention to provide a heat-accumulating hot-water-supplying air conditioner which is capable of "hot water supply and room cooling simultaneously", or "hot water supply and room heating simultaneously", at different temperatures with different heat quantities. This heat-accumulating hot-water-supplying air conditioner is remarkably convenient. It is also an object of the present invention to provide a heat-accumulating hot-water-supplying air conditioner which operates a heat pump mechanism efficiently at a room-heating temperature that can be particularly lower than the temperature required for hot water supply or heat accumulation, and which can suppress proliferation of various kinds of minor germs and scale formation in the heat accumulation tank in the case of hot water supply.

Solution to Problem

A heat-accumulating hot-water-supplying air conditioner according to the present invention includes:

a first circulation channel including a forward route and a return route and configured to connect a first heat demand part which requires hot heat or cold heat, and a first supply heat exchanger which heats or cools a second heat medium through heat exchange with a first heat medium which is temperature increased or temperature decreased, with the forward route along which the second heat medium is directed from the first supply heat exchanger to the first heat demand part, and the return route along which the second heat medium is directed from the first heat demand part to the first supply heat exchanger;

a first heat accumulation tank which is connected to a supply channel and a discharge channel for the second heat medium, the supply channel serving to divide the second heat medium heated by the temperature increased first heat medium in the first supply heat exchanger from the forward route of the first circulation channel, and the discharge channel for the second heat medium joining the return route of the first circulation channel, and which is configured to accommodate the second heat medium heated in the first supply heat exchanger, via the supply channel;

a first switching portion configured to change communication of the second heat medium flowing from the first supply heat exchanger and reaching the first heat demand part and communication of the second heat medium flowing from the forward route of the first circulation channel and branching to the supply channel; and a second circulation channel including a forward route and a return route and configured to allow circulation independently of the first circulation channel, and to connect the first heat accumulation tank and a second heat demand part which requires hot heat, with the forward route along which the second heat medium is directed from the first heat accumulation tank to the second heat demand part, and the return route along which the second heat medium is directed from the second heat demand part to the first heat accumulation tank.

Advantageous Effects of Invention

With the heat-accumulating hot-water-supplying air conditioner of the present invention, "hot water supply and room cooling" can be provided simultaneously, or "hot water supply and room heating" can be provided simultaneously at different temperatures with different heat quantities.

Also, when heat accumulation for the purpose of hot water supply is performed, or when air conditioning such as room heating or room cooling is performed, energy conservation, suppression of proliferation of various kinds of minor germs, and suppression of scale formation can be achieved simultaneously.

DESCRIPTION OF EMBODIMENTS

Figure 1:
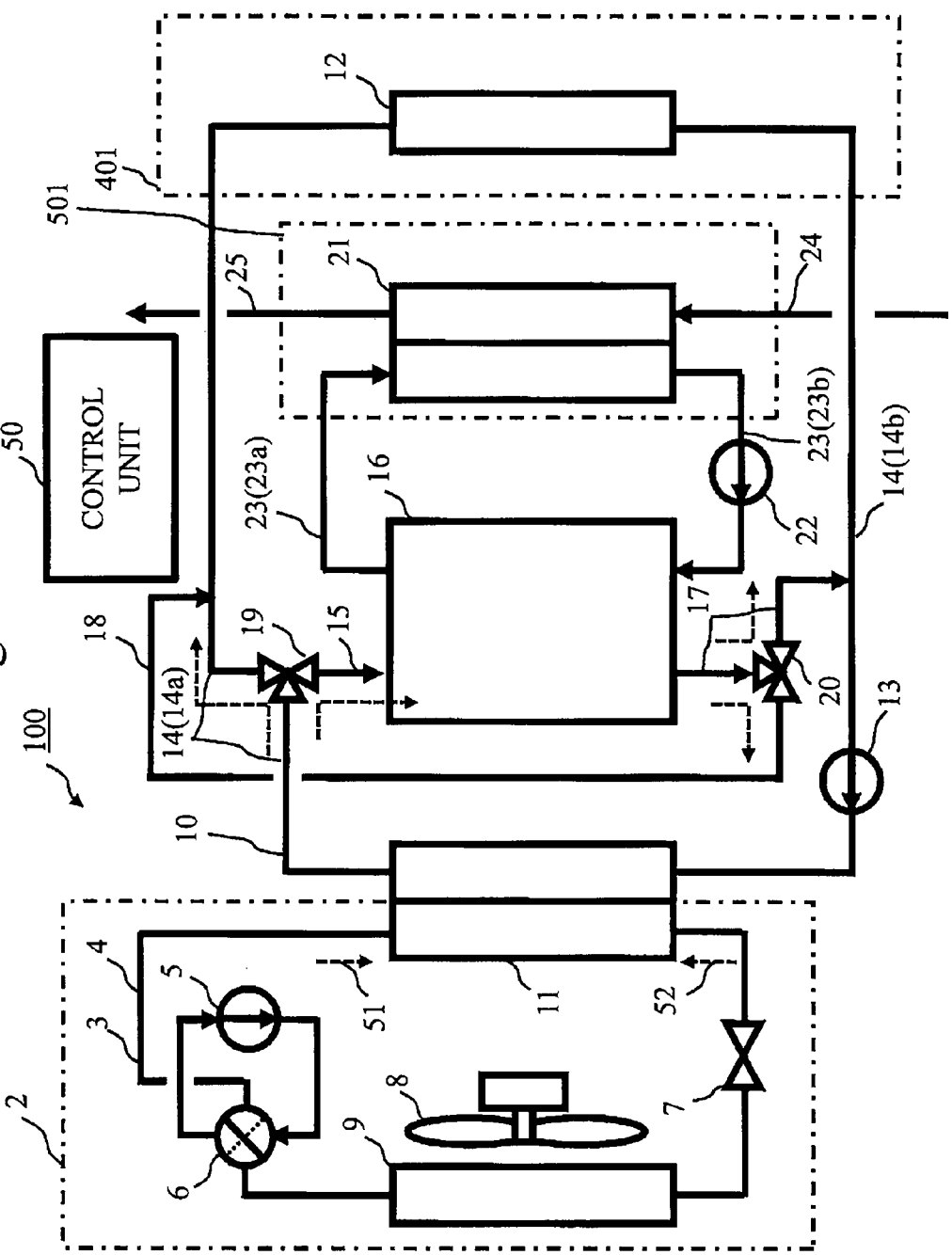
FIG. 1 is a configuration diagram of a heat-accumulating hot-water-supplying air conditioner 100 in Embodiment 1.

The embodiments of the present invention will be described with reference to the accompanying drawings. In the drawings, the same or equivalent members and portions will be denoted by the same reference numerals, and their explanation will be made by referring to these reference numerals.

Embodiment 1

Embodiment 1 will be described with reference to FIGS. 1 to 7. FIG. 1 is a configuration diagram of a heat-accumulating hot-water-supplying air conditioner 100 in Embodiment 1. The heat-accumulating hot-water-supplying air conditioner 100 is provided with, for example, a first circulation channel 14, a first heat accumulation tank 16, a heat accumulation switching valve 19 as an example of the first switching valve, a second circulation channel 23, a return channel 18, an exhaust heat switching valve 20 as an example of the second switching valve, a control unit 50 which controls a control target such as a pump, valve, or compressor.

(Heat Pump Mechanism 2)

The heat-accumulating hot-water-supplying air conditioner 100 is provided with a heat pump mechanism 2 (also called a heat pump unit) as a heat source. The heat pump mechanism 2 is provided with a heat pump circulation channel 4, a compressor 5, a circulation switching valve 6, an expansion valve 7, an outdoor air heat exchanger 9, and a first supply heat exchanger 11.

(1) In the heat pump circulation channel 4, a first heat medium 3, such as a hydrocarbon-based gas or carbon dioxide, which can be rendered to have a gas-liquid two-phase within a use temperature/pressure range is circulated while undergoing compression and expansion.

(2) The compressor 5 pressure-feeds the first heat medium 3, in the gas phase state to increase its temperature and pressure.

(3) The circulation switching valve 6 changes the pressure-feed direction of the compressor 5, namely, the circulating direction of the first heat medium 3 in the heat pump circulation channel 4.

(4) The expansion valve 7 expands the high-pressure, liquid-phase first heat medium 3 into a gas-liquid mixture phase, to decrease its temperature and pressure.

(5) The outdoor air heat exchanger 9 exchanges heat between the outdoor air blown by a fan 8 and the first heat medium 3.

(6) The first supply heat exchanger 11 exchanges heat between the first heat medium 3 and a second heat medium 10, which is an antifreeze solution obtained by mixing glycerin or the like in water to prevent solidification until dropping to a low temperature.

The heat pump mechanism 2 dissipates heat absorbed from either one of the outdoor air and the second heat medium 10, to the remaining one by utilizing condensation and gasification of the first heat medium 3 in the heat pump circulation channel 4. The heat pump mechanism 2 transfers heat between the outdoor air and the second heat medium 10 via the first heat medium 3 efficiently for the power required for compression of the compressor 5. Naturally, in the first supply heat exchanger 11, the first heat medium 3 and second heat medium 10 merely exchange heat and do not mix.

(Cooling and Heating of Second Heat Medium 10)

When cooling the second heat medium 10, the gas-liquid two-phase low-temperature, low-pressure first heat medium 3 flows from the expansion valve 7 to the first supply heat exchanger 11 (direction 52). Meanwhile, when heating the second heat medium 10, the high-temperature, high-pressure gas-phase first heat medium 3 flows from the compressor 5 to the first supply heat exchanger 11 (direction 51). In this manner, the circulating direction of the first heat medium 3 in the heat pump circulation channel 4 reverses between heating and cooling.

(Circulation Switching Valve 6)

The circulation switching valve 6 is a four-way valve. Four connection channels A, B, C, and D are connected to the four-way valve. The four-way valve can change the communication between a state where the connection channels A and B communicate and the connection channels C and D communicate, and a state where the connection channels A and C communicate and the connection channels B and D communicate.

(First Circulation Channel 14/First Heat Accumulation Tank 16)

(1. First Circulation Channel 14)

The heat-accumulating hot-water-supplying air conditioner 100 has the first circulation channel 14 in which the second heat medium 10 is circulated between the first supply heat exchanger 11 and an air-conditioning heat exchanger 12 serving as a first heat demand part 401, by a first pump 13. More specifically, the first circulation channel 14 is a channel that runs through the first supply heat exchanger 11, the heat accumulation switching valve 19, the air-conditioning heat exchanger 12, the first pump 13, and the first supply heat exchanger 11. A forward route 14a of the first circulation channel is a channel that runs through the first supply heat exchanger 11, the heat accumulation switching valve 19, and the air-conditioning heat exchanger 12. A return route 14b of the first circulation channel is a channel that runs through the air-conditioning heat exchanger 12, the first pump 13, and the first supply heat exchanger 11. The air-conditioning heat exchanger 12 is used to cool or heat the indoor air. When the second heat medium 10 is to be heated by the first supply heat exchanger 11, a supply channel 15 branches at a mid point of the forward route 14a where the second heat medium 10 flows from the first supply heat exchanger 11 to the air-conditioning heat exchanger 12. The other end of the supply channel 15 is connected to the upper portion of the first heat accumulation tank 16. A discharge channel 17 is connected to the lower portion of the first heat accumulation tank 16 on a side opposite to the position where the supply channel 15 is connected. The other end of the discharge channel 17 joins a mid point of the return route 14b of the first circulation channel where the second heat medium 10 flows from the air-conditioning heat exchanger 12 to the first supply heat exchanger 11.

(2. First Heat Accumulation Tank 16)

The first heat accumulation tank 16 is hermetically closed against the outside, and constantly contains a predetermined amount of second heat medium 10. As the second heat medium 10 is supplied to the first heat accumulation tank 16 via the supply channel 15, the second heat medium 10 is pushed out from the first heat accumulation tank 16 to the discharge channel 17 and discharged.

(3. Return Channel 18)

The return channel 18 branches from a mid point of the discharge channel 17. The other end of the return channel 18 joins the forward route 14a of the first circulation channel, at a portion between the branching position (where the heat accumulation switching valve 19 is installed) to the supply channel 15 and the air-conditioning heat exchanger 12.

(Air-Conditioning Heat Exchanger 12)

The air-conditioning heat exchanger 12 is provided to a room-cooling or room-heating indoor unit. In the air-conditioning heat exchanger 12, heat transfers between the indoor air and the second heat medium 10 circulating in the first circulation channel 14. When the second heat medium 10 circulates hot heat, the room is heated; when the second heat medium 10 circulates cold heat, the room is cooled. By providing a fan (not shown) that blows the indoor air toward the air-conditioning heat exchanger 12, the heat exchange efficiency can further increase.

Room cooling/heating by means of the air-conditioning heat exchanger 12 may be achieved by radiation, without providing a fan.

(First Pump 13)

The first pump 13 is provided between the first supply heat exchanger 11 and a position where the discharge channel 17 joins the return route 14b of the first circulation channel. A single first pump 13 is provided.

(1) When performing air conditioning (room heating or room cooling operation) with air-conditioning heat exchanger 12 via the forward route 14a of the first circulation channel and the return route 14b of the first circulation channel, the first pump 13 serves to circulate the second heat medium 10 between the first supply heat exchanger 11 and the air-conditioning heat exchanger 12.

(2) When accumulating heat to the first heat accumulation tank 16 via the channel that runs through the supply channel 15, first heat accumulation tank 16, and discharge channel 17, the first pump 13 circulates the second heat medium 10 between the first supply heat exchanger 11 and the first heat accumulation tank 16.

(3) Furthermore, when accumulating heat to the first heat accumulation tank 16 and performing air conditioning with the air-conditioning heat exchanger 12 via the channel that runs through the supply channel 15, first heat accumulation tank 16, discharge channel 17, and return channel 18, the first pump 13 provides power needed to communicate the second heat medium 10 between the first supply heat exchanger 11 and the air-conditioning heat exchanger 12 via the first heat accumulation tank 16.

(First Switching Portion)

In Embodiment 1, as the first switching portion, the heat accumulation switching valve 19, which is a three-way valve, is provided at a portion where the forward route 14a branches into the supply channel 15. The three-way valve is connected to three connection channels A, B, and C. The three-way valve changes the communication between a state where the connection channels A and B communicate, and a state where the connection channels A and C communicate. The communication amounts in the two directions of the three-way valve are changed exclusively such that when the communication in one direction is fully open, the communication in the other direction is fully closed. The heat accumulation switching valve 19 can change the communication amount of the second heat medium 10 branching to the supply channel 15, and the communication amount of the second heat medium 10 not branching into the supply channel 15 but communicating to the forward route 14a of the first circulation cannel, exclusively of each other. More specifically, the first switching portion changes the communication between a state where the second heat medium 10 communicates from the first supply heat exchanger 11 to reach the first heat demand part 401, and a state where the second heat medium 10 branches from the forward route 14a of the first circulation channel 14 into the supply channel 15.

(Second Switching Portion)

As the second switching portion, the exhaust heat switching valve 20, which is a three-way valve, is provided at a portion where the discharge channel 17 branches into the return channel 18. The exhaust heat switching valve 20 can change the communication amount of the second heat medium 10 flowing from the first heat accumulation tank 16 to join the return route 14b of the first circulation channel, and the communication amount of the second heat medium 10 in the return channel 18 that joins the forward route 14a exclusively of each other. More specifically, the second switching portion changes the communication between a state where the second heat medium 10 communicates through the return channel 18, and a state where the second heat medium 10 flowing from the first heat accumulation tank 16 joins the return route 14b of the first circulation channel 14 via the discharge channel 17.

(Second Circulation Channel 23)

In Embodiment 1, a second circulation channel 23, along which the second heat medium 10 is circulated by a second pump 22, is formed between the first heat accumulation tank 16 and a hot-water-supplying heat exchanger 21 which is a second heat demand part 501 and used for hot water supply. In the second circulation channel 23, a forward route 23a of the second circulation channel connects the upper portion of the first heat accumulation tank 16, to which the supply channel 15 is connected, to the hot-water-supplying heat exchanger 21, and a return route 23b of the second circulation channel connects the hot-water-supplying heat exchanger 21 to the lower portion of the first heat accumulation tank 16, to which the discharge channel 17 is connected. In addition to the forward route 23a of the second circulation channel and the return route 23b of the second circulation channel, a water supply channel 24 through which tap water is supplied and a hot-water supply channel 25 which serves for supplying hot water are also connected to the hot-water-supplying heat exchanger 21. The hot-water-supplying heat exchanger 21 exchanges heat between the second heat medium 10 circulated in the second circulation channel 23 and the tap water supplied through the water supply channel 24. The tap water supplied through the water supply channel 24 is heated and supplied to a desired location via the hot-water supply channel 25. Naturally, in the hot-water-supplying heat exchanger 21, the second heat medium 10 in the second circulation channel 23 and the tap water supplied through the water supply channel 24 merely exchange heat and do not mix.

(Operation)

The flow of the heat medium based on the switching control by the heat accumulation switching valve 19 and exhaust heat switching valve 20 will now be explained. The heat accumulation switching valve 19 and exhaust heat switching valve 20 operate in an interlocked manner and are controlled by the control unit 50 in the following manner.

Figure 2:
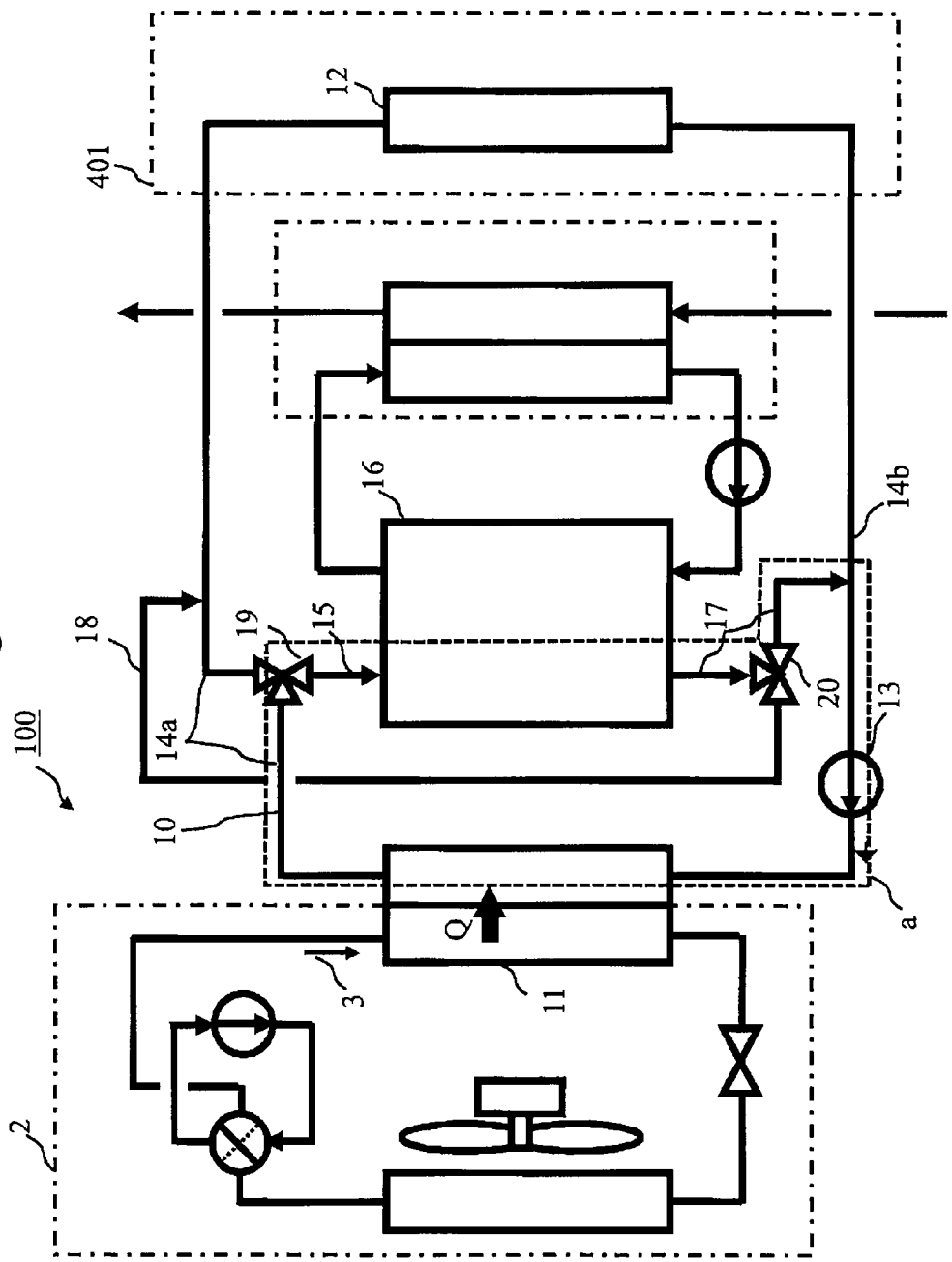
FIG. 2 is a diagram showing the flow of a second heat medium 10 during heat accumulation in Embodiment 1.

(1) FIG. 2 is a diagram showing the flow of the second heat medium 10 during heat accumulating operation. In FIG. 2, a broken line a indicates the flow of the second heat medium 10 in the heat accumulating operation. Referring to FIG. 2, a case (heat accumulating operation) will be described where the heat accumulation switching valve 19 is fully open to the supply channel 15 side and the exhaust heat switching valve 20 is fully open to the return route 14b side of the first circulation channel. When the heat accumulation switching valve 19 is fully open to the supply channel 15 side, the heat accumulation switching valve 19 is fully closed to the air-conditioning heat exchanger 12 side. The entire amount of second heat medium 10 heated by the first supply heat exchanger 11 is supplied to the upper portion of the first heat accumulation tank 16, and is heat-accumulated in the first heat accumulation tank 16 from the upper portion of the first heat accumulation tank 16. This state is called heat accumulating operation. If the exhaust heat switching valve 20 is fully open to the return route 14b side of the first circulation channel, the entire amount of second heat medium 10, which has been discharged via the discharge channel 17 from the lower portion of the first heat accumulation tank 16, joins the return route 14b of the first circulation channel, and is returned to the first supply heat exchanger 11. In this operation, room heating is not performed but only heat accumulation is performed.

Figure 3:
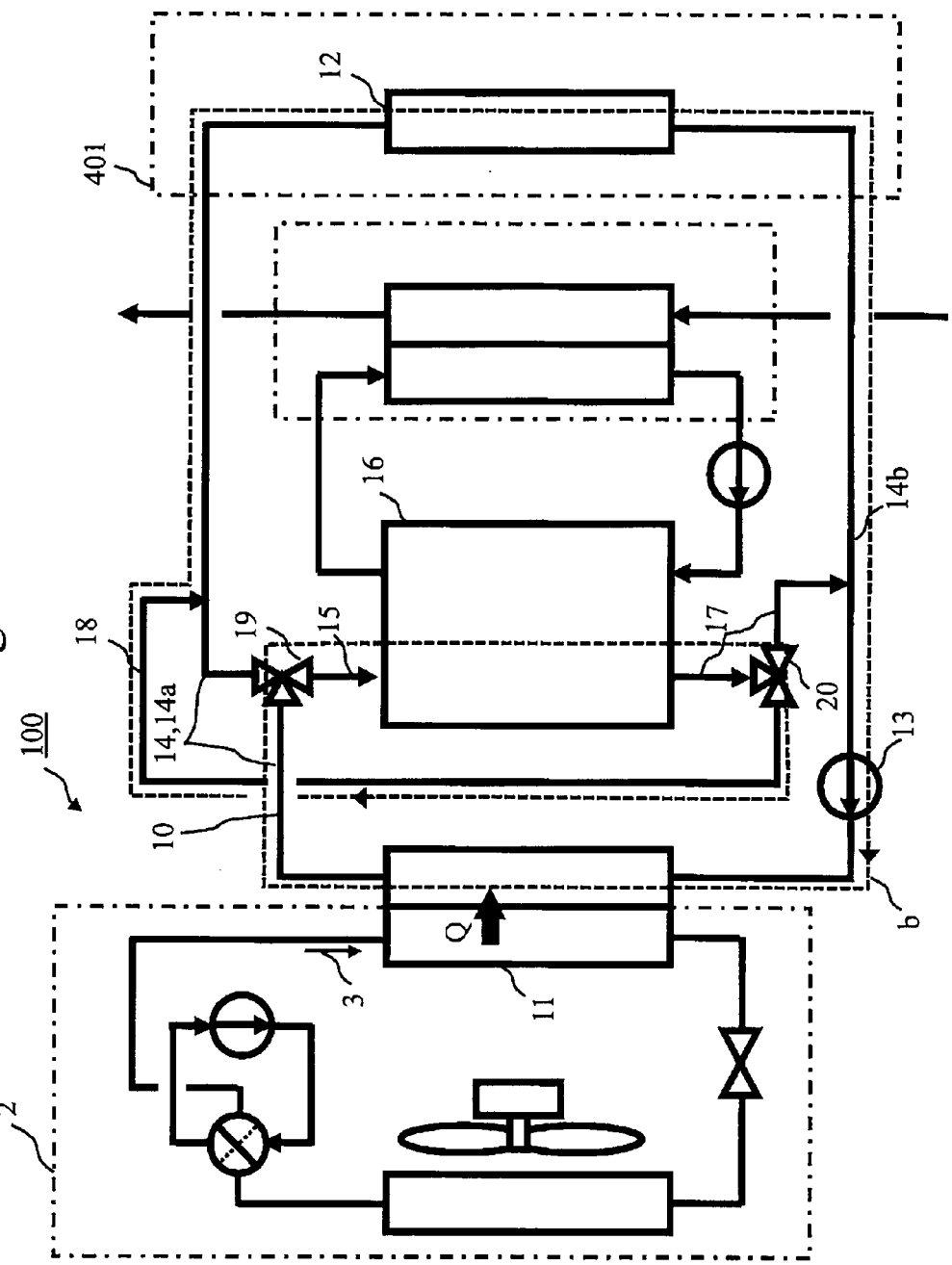
FIG. 3 is a diagram showing the flow of the second heat medium 10 during "heat accumulation and room heating" in Embodiment 1.

(2) FIG. 3 shows the flow of the second heat medium 10 during "heat accumulation and room heating" operation. In FIG. 3, a broken line b indicates the flow of the second heat medium 10 during "heat accumulation and room heating". Referring to FIG. 3, a case (heat accumulating/room heating operation) will be described where the heat accumulation switching valve 19 is fully open to the supply channel 15 side and the exhaust heat switching valve 20 is fully open to the return channel 18 side. If the exhaust heat switching valve 20 is fully open to the return channel 18 side, the entire amount of second heat medium 10, which has been discharged via the discharge channel 17 from the lower portion of the first heat accumulation tank 16, flows in the return channel 18, joins the forward route 14a of the first circulation channel so as to be supplied to the air-conditioning heat exchanger 12, and is returned to the first supply heat exchanger 11.

In this operation state, when the operation of accumulating heat to the first heat accumulation tank 16 is performed, the operation of heating the room by the air-conditioning heat exchanger 12 is performed simultaneously. These simultaneous operations can be performed because of the following reason. Namely, the heat accumulating operation described above is performed when the heat accumulation amount in the first heat accumulation tank 16 has run out. Merely the heat accumulation amount for hot water supply that requires a temperature higher than for room heating has run out, and the second heat medium 10 discharged from the first heat accumulation tank 16 still has a temperature that can be used for room heating.

Figure 4:
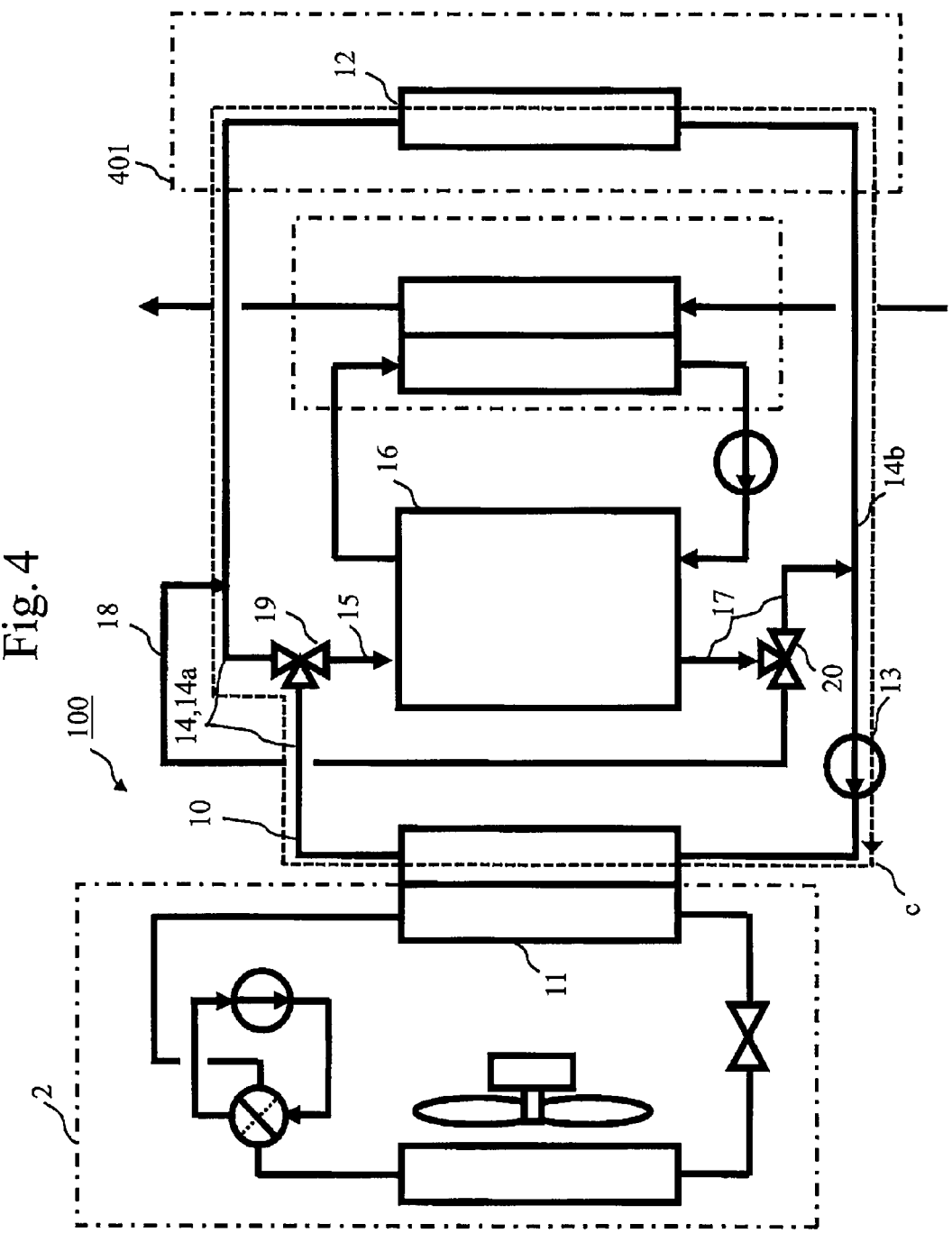
FIG. 4 is a diagram showing the flow of the second heat medium 10 during "room cooling or room heating" in Embodiment 1.

FIG. 4 is a diagram showing the flow of the second heat medium 10 during the "room heating or room cooling" operation. In FIG. 4, a broken line c indicates the flow of the second heat medium 10 during the "room heating or room cooling operation". An explanation will be made by referring to FIG. 4. When the heat accumulation switching valve 19 is fully open to the supply channel 15 side and the exhaust heat switching valve 20 is fully closed or fully open to the return channel 18 side, the following situation arises. The entire amount of the second heat medium 10 heated or cooled by the first supply heat exchanger 11 is supplied to the air-conditioning heat exchanger 12, and heat is not accumulated in the first heat accumulation tank 16, so the air-conditioning heat exchanger 12 performs either room heating operation or room cooling operation. At this time, if the exhaust heat switching valve 20 is not fully open or closed to the return channel 18 side but is on the way of opening or closing, the second heat medium 10 bypasses the air-conditioning heat exchanger 12 and flows back from the forward route 14a of the first circulation channel to the return route 14b of the first circulation channel via the return channel 18. This half-open/half-closed state of the exhaust heat switching valve 20 may be prevented, or the return channel 18 may be provided with a check valve to prevent back flow. Alternatively, the back flow in the return channel 18 may be utilized, so that the high-temperature second heat medium 10 that has just been switched from the heat accumulating operation to the room heating operation (which is performed at a temperature lower than in the heat accumulating operation) is subjected to transient adjustment so as not to be supplied to the air-conditioning heat exchanger 12.

Figure 5:
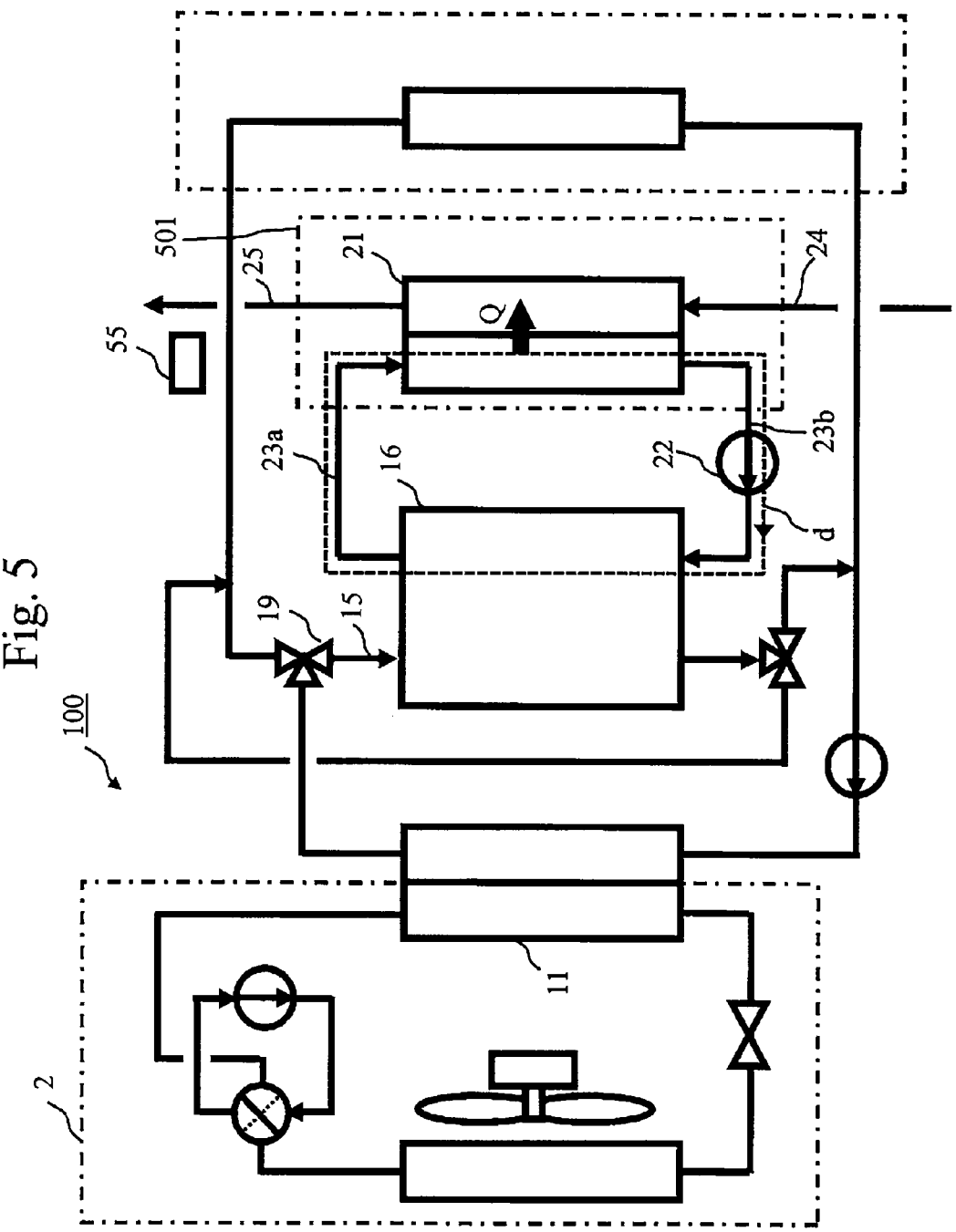
FIG. 5 is a diagram showing the flow of the second heat medium 10 during "hot water supply" in Embodiment 1.

FIG. 5 is a diagram showing the flow of the second heat medium 10 during the "hot-water supplying" operation. In FIG. 5, a broken line d indicates the flow of the second heat medium 10 during the hot-water supplying operation. An example of the hot-water supplying operation will be described with reference to FIG. 5. When a water flow sensor 55 of the hot-water supply channel 25 detects hot-water supply, the second pump 22 is driven. The high-temperature (for example, 55° C.) second heat medium 10 in the upper portion of the first heat accumulation tank 16 is supplied to the hot-water-supplying heat exchanger 21 via the forward route 23a of the second circulation channel. The low-temperature (for example, 20° C.) water supplied to the hot-water-supplying heat exchanger 21 via the water supply channel 24 is heated by heat exchange with the second heat medium 10 to a hot water supply temperature (for example, 45° C.), and is supplied via the hot-water supply channel 25. Therefore, as long as heat is accumulated in the first heat accumulation tank 16, hot-water supplying operation is possible independently of room cooling or room heating by the air-conditioning heat exchanger 12.

During the hot-water supplying operation, the second heat medium 10 with a dropped temperature (for example, 35° C.) is returned from the hot-water-supplying heat exchanger 21 to the lower portion of the first heat accumulation tank 16 via the return route 23b of the second circulation channel. The above temperature can take various temperature patterns according to the temperature, flow rate, specific heat, and the like of the second heat medium 10 in the second circulation channel 23, and of the water supplied from the water supply channel 24. In this case, the temperature of the hot water supplied from the hot-water supply channel 25 can be easily controlled by operating the rotation frequency of the second pump 22 or the like. When hot water supply from the hot-water supply channel 25 continues, the heat accumulation amount in the first heat accumulation tank 16 gradually decreases. More specifically, in the first heat accumulation tank 16, the low-temperature region of the second heat medium 10 gradually enlarges from the lower portion side, and the high-temperature region of the second heat medium 10 on the upper portion side gradually diminishes. When the low-temperature region covers the second heat medium 10 in the first heat accumulation tank 16 up to the upper portion, this signifies that the heat accumulation amount has run out. Then, hot water supply at a hot water supply temperature (for example, 45° C.) can no longer be performed, as a matter of fact.

(Heat Accumulating Operation)

Figure 6:
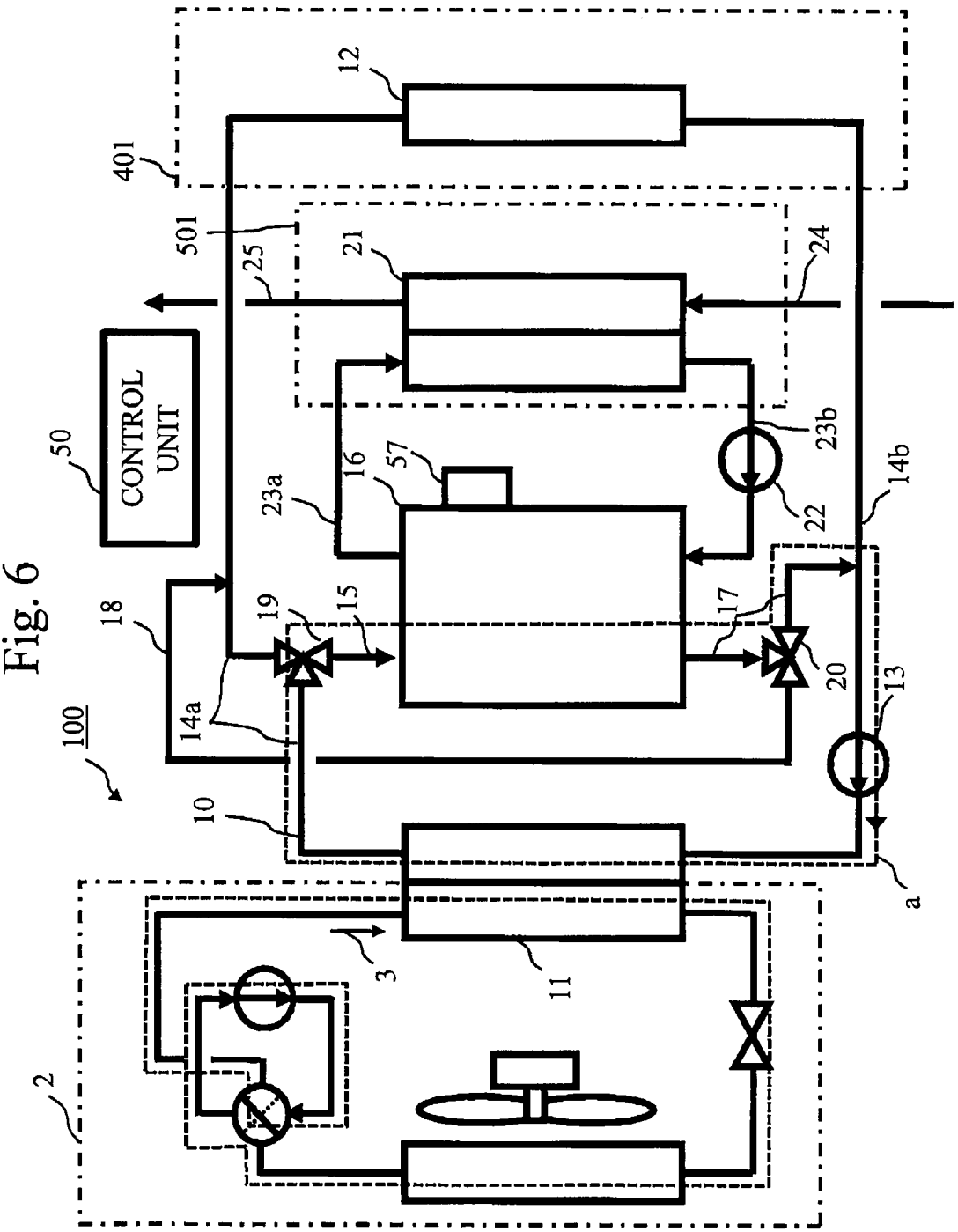
FIG. 6 is a diagram, different from FIG. 2, showing the flow of the second heat medium 10 during heat accumulation in Embodiment 1.

FIG. 6 is a diagram showing the flow of the second heat medium 10 during heat accumulation (heat accumulating operation performed before accumulated heat in first heat accumulation tank 16 runs out). In FIG. 6, the flow of the second heat medium 10 is the same as in FIG. 2, and is accordingly indicated by a broken line a. With reference to FIG. 6, heat accumulating operation will be described which is performed before the heat accumulation amount in the first heat accumulation tank 16 runs out.

The control unit 50 detects a decrease in heat accumulation amount when the temperature detected by a temperature sensor 57 provided to (for example, the upper side of the center of) the first heat accumulation tank 16 drops to a predetermined temperature or less. The control unit 50 drives the heat pump mechanism 2, and supplies to the first supply heat exchanger 11 the first heat medium 3 which has been temperature increased by compression with the compressor 5. When the control unit 50 drives the first pump 13, the second heat medium 10 is supplied to the first supply heat exchanger 11 by the first circulation channel 14, and the second heat medium 10 is heated by heat exchange with the first heat medium 3. During the heat accumulating operation, the heating temperature of the second heat medium 10 is adjusted to a temperature (for example, 55° C.) higher than the temperature for the room heating operation. More specifically, the heating temperature of the second heat medium 10 is adjusted by adjusting the temperature and flow rate of the first heat medium 3 supplied to the first supply heat exchanger 11 by the heat pump mechanism 2. Alternatively, the heating temperature of the second heat medium 10 can be adjusted by the flow rate of the second heat medium 10 circulated by the first pump 13. If the heat accumulation switching valve 19 is fully open to the supply channel 15 side, the second heat medium 10 heated by the first supply heat exchanger 11 is supplied to the upper portion of the first heat accumulation tank 16 by the supply channel 15, so the first heat accumulation tank 16 accumulates heat. At this time, if room heating operation by the air-conditioning heat exchanger 12 is not required simultaneously with the heat accumulating operation, the exhaust heat switching valve 20 is fully closed to the return channel 18 side (this state corresponds to the case of FIG. 6). Thus, the second heat medium 10 discharged from the lower portion of the first heat accumulation tank 16 via the discharge channel 17 joins the return route 14b of the first circulation channel. For example, the second heat medium 10 discharged at the temperature of 35° C. from the lower portion of the first heat accumulation tank 16 is returned to the first supply heat exchanger 11. As the second heat medium 10 repeatedly circulates in this channel (broken line), the operation of accumulating heat in the first heat accumulation tank 16 is performed.

If room heating operation by the air-conditioning heat exchanger 12 is required simultaneously with the operation of accumulating heat in the first heat accumulation tank 16, the exhaust heat switching valve 20 is fully opened to the return channel 18 side. This corresponds to the case described by referring to the channel of the broken line b in FIG. 3. The second heat medium 10 discharged from the lower portion of the first heat accumulation tank 16 via the discharge channel 17 joins the forward route 14a of the first circulation channel via the return channel 18. For example, the second heat medium 10 discharged from the lower portion of the first heat accumulation tank 16 is supplied at the temperature of 35° C. to the air-conditioning heat exchanger 12, is heat-exchanged, and is returned at the temperature of for example, 25° C. to the first supply heat exchanger 11. As the second heat medium 10 repeatedly circulates in this channel (broken line b), heat is continuously accumulated in the first heat accumulation tank 16, and simultaneously the room heating operation by the air-conditioning heat exchanger 12 is continued.

Figure 7:
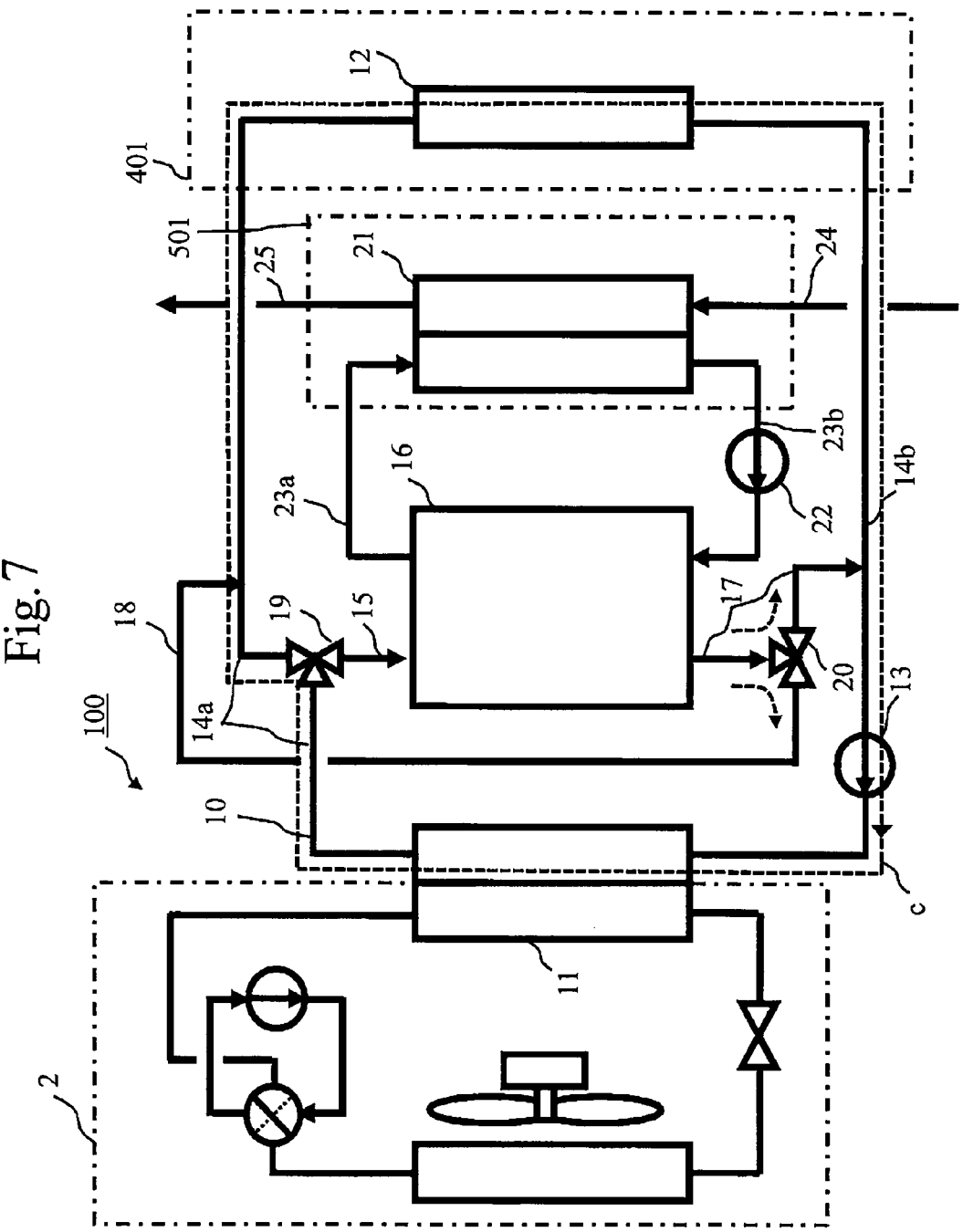
FIG. 7 is a diagram showing the flow of the second heat medium 10 in a case where sufficient heat is accumulated in Embodiment 1.

FIG. 7 is a diagram showing the flow of the second heat medium 10 in a case where sufficient heat is accumulated in the first heat accumulation tank 16. The channel of the second heat medium 10 is the channel of the broken line c in FIG. 4. If the heat accumulation amount in the first heat accumulation tank 16 is sufficient, the second heat medium 10 to be heated by the first supply heat exchanger 11 may have a low temperature of, for example, about 35° C. The heat accumulation switching valve 19 is fully closed to the supply channel 15 side, and the exhaust heat switching valve 20 is either fully closed or fully open to the return route side, so the second heat medium will not flow from the supply channel 15 to the first heat accumulation tank 16. Then, the first heat accumulation tank 16 is completely separated from the first circulation channel 14. Independently of or simultaneously with the hot-water supplying operation by the hot-water-supplying heat exchanger 21, the second heat medium 10 heated by the first supply heat exchanger 11 is supplied to the air-conditioning heat exchanger 12. This enables the air-conditioning heat exchanger 12 to perform room heating operation. The second heat medium 10 of the first circulation channel 14 may transport cold heat instead of hot heat accumulated in the first heat accumulation tank 16. As the second heat medium 10 cooled by the first supply heat exchanger 11 is supplied to the air-conditioning heat exchanger 12, the air-conditioning heat exchanger 12 can perform not only the room heating operation but also the room cooling operation.

Assume that the temperature of the second heat medium 10 at the outlet of the first supply heat exchanger 11 during the heat accumulating operation described above and the "heat accumulating and room heating" operation, namely, when the heated second heat medium 10 is supplied to the first heat accumulation tank 16 (during the heat accumulating operation), is defined as a first temperature T1. Also, assume that the temperature of the second heat medium 10 at the outlet of the first supply heat exchanger 11 during the room cooling operation, or during the room heating operation without heat accumulation, namely, when the heated second heat medium 10 is not supplied to the first heat accumulation tank 16, is defined as a second temperature T2. In this case, the second temperature T2 is lower than the first temperature T1 not only during the room cooling operation but also during the room heating operation. Namely, $$T1>T2$$

is established.

In the above description, the temperature of the second heat medium 10 at the outlet of the first supply heat exchanger 11 is relatively regulated to be the first temperature T1 when heat accumulation is accompanied, and the second temperature T2 lower than the first temperature T1 during the room cooling/heating operation not accompanying heat accumulation. Each of the first temperature T1 and the second temperature T2 need not be a single temperature (fixed value). For example, when the heat accumulation capacity is to be increased, the first temperature T1 of the second heat medium 10 may be higher than an ordinary temperature. The second temperature T2 may be higher than an ordinary temperature when the room heating capacity is to be increased, and lower than an ordinary temperature when the room cooling capacity is to be increased. By changing the first temperature T1 or second temperature T2 in this manner, the heat accumulation capacity and the room cooling/heating capacity can be set more flexibly.

By using the heat-accumulating hot-water-supplying air conditioner 100 of Embodiment 1, a single heat pump mechanism 2 can supply hot heat or cold heat (for room heating or room cooling) to the air-conditioning heat exchanger 12 and hot heat (hot water supply) to the hot-water-supplying heat exchanger 21 simultaneously and independently of each other with different suitable heat quantities and temperatures. This leads to a great convenience.

In the operation of the heat-accumulating hot-water-supplying air conditioner 100 of Embodiment 1, the temperature of the second heat medium 10 at the outlet of the first supply heat exchanger 11 is set differently to the first temperature T1 for the heat accumulating operation or the "heat accumulating and room heating" operation, and to the second temperature T2, lower than the first temperature T1, for the room heating operation. In general, the heat pump mechanism 2 can be operated more efficiently if the second heat medium 10 having the second temperature T2, which is lower than the first temperature T1, is generated. Since the heat accumulating operation is not always required, the heat-accumulating hot-water-supplying air conditioner 100 that performs both the room heating operation and the heat accumulating operation can supply required hot heat with a less power, that is, more efficiently, than in a case where the second heat medium 10 is generated to have a single temperature (the temperature T1 which is the highest required temperature).

As the application of the first heat accumulation tank 16 is limited to hot water supply and heat can be additionally accumulated whenever necessary, an excessively large heat accumulation amount need not be reserved in the first heat accumulation tank 16. Thus, the first heat accumulation tank 16 can be made compact. As heat accumulation of a comparatively low temperature (55° C. in the above case) suffices, the power of the heat pump mechanism 2 for heat accumulation can be reduced. Also, heat radiation can be suppressed without enhancing heat insulation.

As the hot water to be supplied is not reserved water (hot water), various kinds of minor germs that may proliferate at a low temperature can be avoided from mixing in the hot supply water. Hence, the hygiene of the hot supply water can be maintained. As a temporary high-temperature operation for the purpose of sterilization is not needed, the heat pump mechanism 2 is not operated inefficiently.

A temporary high-temperature operation using an electric heater, instead of the heat pump mechanism 2, for the purpose of sterilization is not needed. Therefore, power consumption can be reduced, leading to energy conservation. As reserved water (hot water) is not supplied, water need not be additionally supplied to a portion that reserves water (hot water) by supplying hot water. This means that no additional component is supplied that may form scale and be contained in the water to be supplied. This suppresses scale formation. As the heat accumulating operation can be performed whenever necessary, a temperature higher than necessary need not be set for the purpose of increasing the heat accumulation capacity. Also, only low-temperature (approximately 45° C.) hot water need be supplied by heat exchange. This can suppress scale formation which tends to occur at a high temperature.

The heat-accumulating hot-water-supplying air conditioner 100 is provided with the return channel 18. When the heat accumulation amount in the first heat accumulation tank 16 has decreased due to hot water supply and the operation of accumulating heat to the first heat accumulation tank 16 is performed accordingly, the second heat medium 10 is supplied to the first heat accumulation tank 16 via the supply channel 15 so that the first heat accumulation tank 16 accumulates heat. Simultaneously with this heat accumulation, by utilizing the heat exhausted from the first heat accumulation tank 16, hot heat (for room heating) that is satisfactory with a temperature lower than in the operation of accumulating heat in the first heat accumulation tank 16 can be supplied to the air-conditioning heat exchanger 12 via the return channel 18. In addition, the temperature of the second heat medium 10 returning to the first supply heat exchanger 11 during the heat accumulating operation can be decreased if the second heat medium 10 flows via the air-conditioning heat exchanger 12. This allows a large input/output temperature difference in the first supply heat exchanger 11, so that the heat pump mechanism 2 can be operated with a higher efficiency.

Modification of Embodiment 1

A modification of Embodiment 1 will be described hereinafter.

(Second Heat Medium 10)

In Embodiment 1, the second heat medium 10 is an antifreeze solution. Alternatively, the second heat medium 10 may be water, although water requires antifreeze temperature management.

(Return Channel 18 and Exhaust Heat Switching Valve 20)

Although the return channel 18 and the exhaust heat switching valve 20 are provided to Embodiment 1, they need not be provided. In this case, the effect obtained by providing at least the return channel 18, for example, an effect of enabling efficient operation of the heat pump mechanism 2, or the effect of providing a higher convenience, by performing simultaneous operation of the heat accumulating operation and the room heating operation so that the input/output temperature difference of the second heat medium 10 in the first supply heat exchanger 11 is increased, is not achieved. However, the other effects can be obtained similarly.

(Communicating Direction of Second Heat Medium 10)

In Embodiment 1, the communicating direction of the second heat medium 10 circulating in the first circulation channel 14 stays the same between the cases of cooling and heating the second heat medium 10 by the first supply heat exchanger 11. Alternatively, the second heat medium 10 may circulate in opposite directions between the case of heating (room heating operation, heat accumulating operation) and the case of cooling (room cooling operation). For this purpose, the rotating direction of the first pump 13 may be reversed, or a switching valve and a pipe which is similar to the pipe between the circulation switching valve 6 and compressor 5 in the heat pump mechanism 2 may be provided, and the circulating direction of the second heat medium 10 may be reversed. When the second heat medium 10 is being cooled by the first supply heat exchanger 11, the second heat medium 10 circulates in a direction opposite to the direction for heating. Then, the forward route 14a of the first circulation channel described above becomes the return route, and the return route 14b of the first circulation channel becomes the forward route. As the circulating direction of the first heat medium 3 is reversed between heating and cooling, if the circulating direction of the second heat medium 10 is reversed between heating and cooling, countercurrent flows can be formed both during heating and cooling. As a result, high heat exchange efficiency in the first supply heat exchanger 11 can be maintained. Furthermore, when the circulating direction of the second heat medium 10 in the first circulation channel 14 is to be reversed between the case of heating the second heat medium 10 by the first supply heat exchanger 11 and the case of cooling the second heat medium 10 by the first supply heat exchanger 11, the following measure may be taken. Namely, a pipe extending from the forward route 14a of the first circulation channel to the return route 14b of the first circulation channel, and a pipe extending from the return route 14b of the first circulation channel to the forward route 14a of the first circulation channel may be formed such that the two pipes cross each other, and a switching valve may be provided. The direction of supplying the second heat medium 10 to the air-conditioning heat exchanger 12 serving as the first heat demand part 401 need not always be changed between the room cooling operation and the room heating operation.

(Air-Conditioning Heat Exchanger 12)

A plurality of air-conditioning heat exchangers 12 may be provided in parallel to each other which branch from the forward route 14a of the first circulation channel and join the return route 14b of the first circulation channel. As the first heat demand part 401, not only the air-conditioning heat exchanger 12 but also a so-called floor heating system which heats the room air from the floor surface may be employed.

(First Switching Portion)

The first switching portion need not be a three-way valve such as the heat accumulation switching valve 19 provided to the branching portion to the supply channel 15. For example, the first switching portion may be constituted by two valves, namely, a valve provided to the forward route 14a of the first circulation channel at a portion between the branching portion to the supply channel 15 and the joining portion to the return channel 18, and a valve provided midway along either the supply channel 15 or the discharge channel 17. Then, the degrees of opening of the valves can be changed (adjusted) individually. As a result, the communication amounts are not exclusive of each other, and can be changed over a wider range than in a case where a three-way valve is employed. Any valve, including a three-way valve, may be an on/off valve which selectively takes either of two positions, that is, an open position or closed position with respect to the communicating direction. It is better if the valve is a control valve that can be stopped at a halfway degree of opening.

(Second Switching Portion)

As with the first switching portion, the second switching portion need not be a three-way valve provided at a branching portion to the return route, like the exhaust heat switching valve 20. For example, the second switching portion may be constituted by two valves, namely, a valve provided to the return channel 18 and a valve provided to the discharge channel 17 at a portion after the branching portion to the return channel 18. Then, the degrees of opening of the valves can be changed (adjusted) individually. As a result, the communication amounts are not exclusive of each other, and can be changed over a wider range than in a case where a three-way valve is employed. If the second switching portion is not a three-way valve, the return channel 18 need not branch from the discharge channel 17, but may be connected to the lower portion of the first heat accumulation tank 16 directly. Any valve, including a three-way valve, may be an on/off valve which selectively takes either of two positions, that is, an open position or closed position with respect to the communicating direction. It is better if the valve is a control valve that can be stopped at a halfway degree of opening. If each of the first switching portion and second switching portion is constituted by two valves, the valve provided to the discharge channel 17 may be shared by the first switching portion and second switching portion.

During an operation (heat accumulating operation) where at least part of the second heat medium 10 having the first temperature T1 is supplied to the first heat accumulation tank 16 via the supply channel 15, assume that a temperature T16 of the second heat medium 10 discharged from the first heat accumulation tank 16 is lower than the second temperature T2 and higher than a temperature T12 of the return route 14b of the first circulation channel at the outlet of the air-conditioning heat exchanger 12 of the first heat demand part 401. That is, assume that $$T2 > T16 > T12$$

is satisfied. In this case, the following control operation is performed.

Namely, the heat accumulation switching valve 19 serving as the first switching portion is formed to be able to change its degree of opening continuously, so that the heat accumulation switching valve 19 can adjust the flow rate. Also, the exhaust heat switching valve 20 serving as the second switching portion is switched such that the entire amount of the second heat medium 10 discharged from the first heat accumulation tank 16 communicates through the return channel 18. Then, the mixing ratio of the communication amount of the second heat medium 10 which is directly supplied from the first supply heat exchanger 11 to the air-conditioning heat exchanger 12 without passing through the supply channel 15 and the communication amount of the second heat medium 10 which communicates through the supply channel 15, the first heat accumulation tank 16, and return channel 18 and joins the forward route 14a of the first circulation channel can be changed. By changing the mixing ratio, the temperature of the second heat medium 10 to be supplied to the air-conditioning heat exchanger 12 can be adjusted within a range of the first temperature T1 and a temperature (the temperature T16 of the second heat medium 10 discharged from the first heat accumulation tank 16) lower than the temperature T2 at which of the second heat medium 10 communicates in the return channel 18. For example, the temperature of the second heat medium 10 to be supplied to the air-conditioning heat exchanger 12 can be controlled to the temperature T2. Then, during the heat accumulating operation, the second heat medium 10 having the temperature T1 can be supplied to the first heat accumulation tank 16. Also, during the room heating operation in the heat accumulating, room heating simultaneous operation, the second heat medium 10 can be reliably supplied at the temperature T2 to the air-conditioning heat exchanger 12 which is the first heat demand part 401. Moreover, hot heat that is accumulated in the first heat accumulation tank 16 but cannot be utilized for hot water supply because it is not sufficiently hot can be utilized to the maximum for room heating. Hot heat which joins the return route 14b of the first circulation channel without being utilized by the first heat accumulation tank 16 can be minimized. Thus, temperature rise of the second heat medium 10 communicating in the return route 14b of the first circulation channel and returning to the first supply heat exchanger 11 can be suppressed. A large input/output temperature difference of the second heat medium 10 of the first supply heat exchanger 11 can be maintained, so that the heat pump mechanism 2 can be operated with high efficiency, leading to energy conservation.

(Second Circulation Channel 23)

In Embodiment 1, the forward route 23a of the second circulation channel and the return route 23b of the second circulation channel are directly connected to the first heat accumulation tank 16. Alternatively, the forward route 23a of the second circulation channel may branch from the supply channel 15, and the return route 23b of the second circulation channel may join the discharge channel 17. If a sufficiently high water supply pressure is not available for the tap water to be supplied to the hot-water-supplying heat exchanger 21 via the water supply channel 24, a pump (not shown) may be provided to the water supply channel 24 or hot-water supply channel 25.

(Second Heat Demand Part 501)

Although Embodiment 1 shows, as the second heat demand part 501, the hot-water-supplying heat exchanger 21 which serves for hot water supply, another second heat demand part 501 may be employed. For example, in place of heating tap water with an arrangement similar to that including the hot-water-supplying heat exchanger 21, second pump 22, and second circulation channel 23, a reheating heat exchanger which heats bathtub water circulated from a bathtub by a pump (not shown) may be employed as the second heat demand part 501. Also, a plurality of second heat demand parts 501 may be provided each including a hot-water-supplying heat exchanger and a reheating heat exchanger, together with a separate second circulation channel and a second pump.

(Supply Channel 15, Discharge Channel 17)

In Embodiment 1, the supply channel 15 and discharge channel 17 are connected to the upper and lower portions, respectively, of the first heat accumulation tank 16. Alternatively, the supply channel 15 and discharge channel 17 may be connected to portions other than the upper and lower portions of the first heat accumulation tank 16. It suffices as far as the supply side and discharge side for the second heat medium 10 are located at opposite positions and that a high-temperature portion and a low-temperature portion form separate layers in the first heat accumulation tank 16.

The above modification may naturally be applied to the following embodiments when necessary.

Embodiment 2

Figure 8:
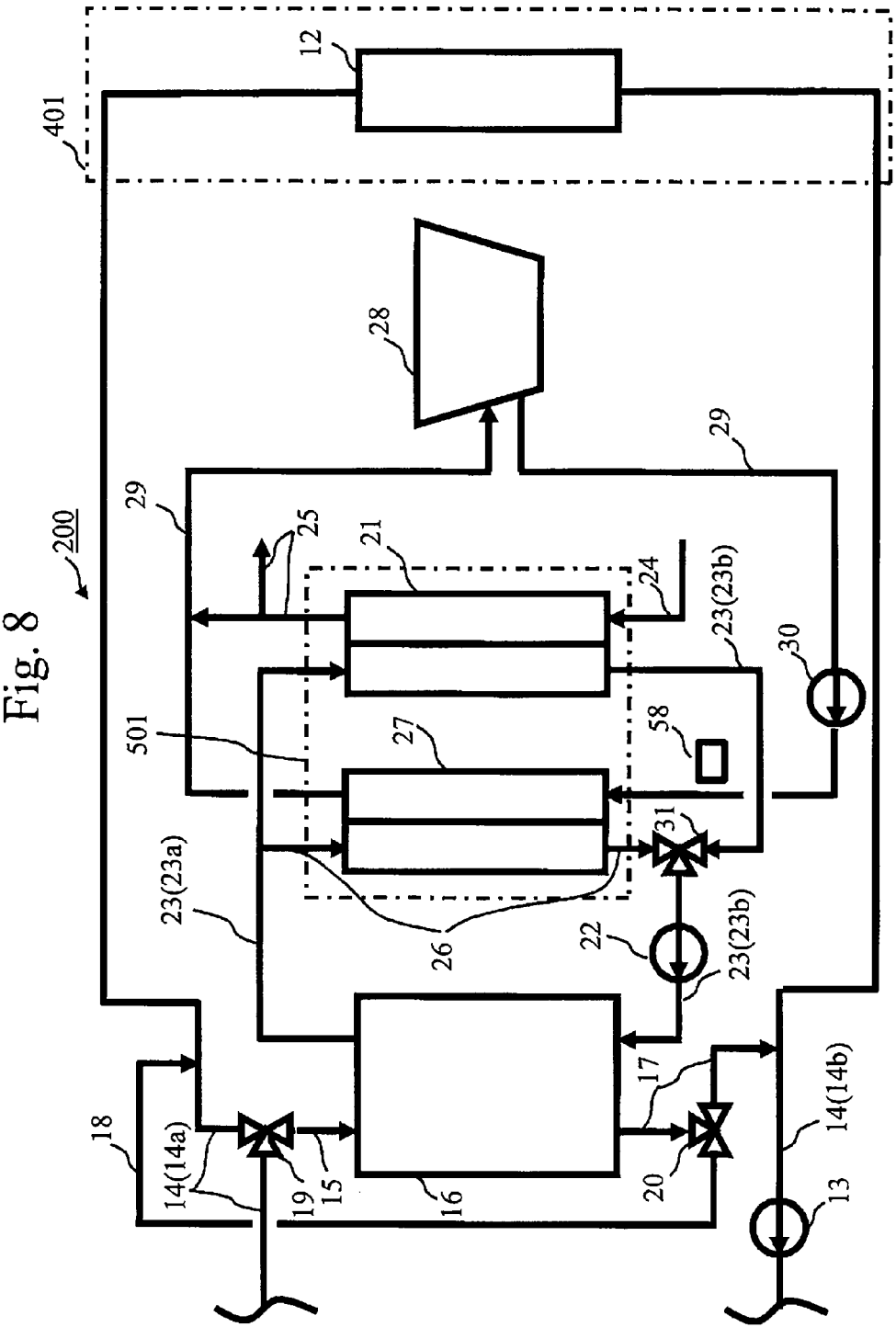
FIG. 8 is a configuration diagram showing a heat-accumulating hot-water-supplying air conditioner 200 in Embodiment 2.

FIG. 8 is a configuration diagram showing a heat-accumulating hot-water-supplying air conditioner 200 according to Embodiment 2. Points that are different from Embodiment 1 will be explained.

Embodiment 2 has, as a second heat demand part 501, a hot-water-supplying heat exchanger 21 which is connected to a first heat accumulation tank 16 via a forward route 23a of the second circulation channel and a return route 23b of the second circulation channel, in the same manner as the heat-accumulating hot-water-supplying air conditioner 100. In addition, the second heat demand part 501 is provided with a reheating heat exchanger 27 (second heating portion) midway along a reheating channel 26 (branch channel) which branches from the forward route 23a of the second circulation channel and joins the return route 23b of the second circulation channel. The reheating heat exchanger 27 serves to heat bathtub water, circulated through a bathtub water circulation channel 29 to and from a bathtub 28 by a reheating pump 30, by a second heat medium 10 communicating in the reheating channel 26. In the reheating heat exchanger 27, the bathtub water and the second heat medium 10 only heat-exchange; they do not mix, as a matter of course.

The hot-water supply channel 25 locally branches to join the bathtub water circulation channel 29, so that hot water can be supplied from the bathtub water circulation channel 29 to the bathtub 28. A shutoff valve (not shown), which is opened when supplying hot water to the bathtub 28 and closed when not supplying hot water to the bathtub 28, is provided midway along a channel that branches from the hot-water supply channel 25 and joins the bathtub water circulation channel 29.

(Third Switching Portion)

A reheating switching valve 31 serving as the third switching portion is provided at a portion where the reheating channel 26 joins the return route 23b of the second circulation channel. The reheating switching valve 31 is a three-way valve, and can exclusively change the communication amount of the second heat medium 10 branching from the forward route 23a and communicating to the reheating heat exchanger 27 via the reheating channel 26, and the communication amount of the second heat medium 10 communicating in the hot-water-supplying heat exchanger 21.

Except for that, the structure of Embodiment 2 is the same as that of Embodiment 1.

(Operation)

The operation will be described below.

(Hot-Water Supplying Operation)

In the hot-water supplying operation, a control unit 50 drives a second pump 22, and switches the reheating switching valve 31 to be fully closed to the reheating channel 26 side, so the second heat medium 10 in the first heat accumulation tank 16 communicates from the forward route 23a of the second communication channel to the return route 23b of the second communication channel via the hot-water-supplying heat exchanger 21. Water supplied from a water supply channel 24 is heated in the hot-water-supplying heat exchanger 21 by heat exchange with the second heat medium 10 of the second circulation channel 23, and is supplied via the hot-water supply channel 25. The hot-water supplying operation is the same as that of Embodiment 1 except for the manipulation of the reheating switching valve 31.

(Reheating Operation)

In the reheating operation (which may be started when requested by a person, or automatically through detection of the temperature of a bathtub 28) of reheating the bathtub water, the control unit 50 controls the reheating pump 30 so the bathtub water circulates through the bathtub water circulation channel 29 between the bathtub 28 and the reheating heat exchanger 27. Simultaneously, the control unit 50 drives the second pump 22 to switch the reheating switching valve 31 to be fully open to the reheating channel 26 side. Then, the second heat medium 10 in the first heat accumulation tank 16 communicates from the forward route 23a of the second circulation channel to the return route 23b of the second circulation channel via the reheating channel 26, and is supplied to the reheating heat exchanger 27.

The second heat medium (at, for example, 55° C.) exchanges heat with the bathtub water in the reheating heat exchanger 27. When this reheating operation is continued, the bathtub water in the bathtub 28 is reheated to a predetermined temperature (for example, 42° C.). The temperature of the bathtub water of the bathtub water circulation channel 29 entering the reheating heat exchanger 27 from the bathtub 28 is detected by a temperature sensor 58. When the detected temperature reaches a predetermined temperature, the reheating operation is ended. Alternatively, a person may request end of the reheating operation, as a matter of course.

The heat-accumulating hot-water-supplying air conditioner 200 of Embodiment 2 has the structure described above. In addition to the hot-water-supplying heat exchanger 21 connected as the second heat demand part 501 to the second circulation channel, the reheating channel 26, the reheating heat exchanger 27, and the reheating switching valve 31 are provided. Thus, the hot-water supplying operation and the bathtub water reheating operation can be achieved by a single second pump 22.

Modification of Embodiment 2

The third switching portion need not be a three-way valve provided to a portion where the reheating channel 26 joins the return route 23b of the second circulation channel, unlike the reheating switching valve 31, but may be a three-way valve provided to a portion where the forward route 23a of the second circulation channel branches into the reheating channel 26.

For example, the third switching portion may be constituted by two valves, namely, a valve provided to the reheating channel 26, and a valve provided to either the return route 23b of the second circulation channel at a portion between the hot-water-supplying heat exchanger 21 and the joining portion to reheating channel 26, or the forward route 23a of the second circulation channel at a portion between the hot-water-supplying heat exchanger 21 and the branching portion to the reheating channel 26. Then, the degrees of opening of the valves can be adjusted individually. As a result, the communication amounts are not exclusive of each other, and can be changed within a wider range than in a case where a three-way valve is employed. Any valve, including the three-way valve, may be an on/off valve which selectively takes either of two positions, that is, an open position or closed position with respect to the communicating direction. It is better if the valve is a control valve that can be stopped at a halfway degree of opening. Then, the hot-water supplying operation and the bathtub water reheating operation can be performed simultaneously by a single second pump 22.

Embodiment 3

Figure 9:
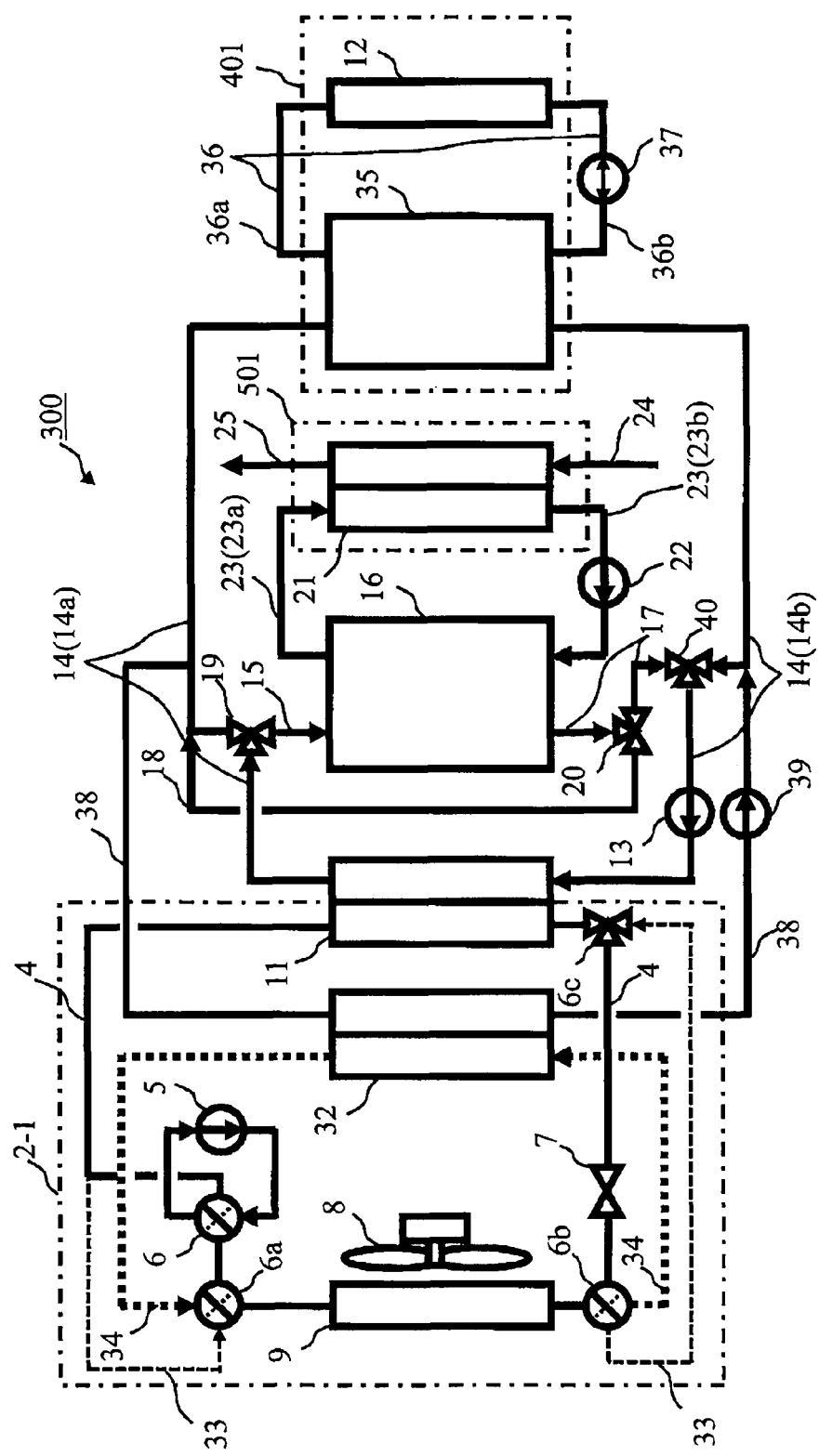
FIG. 9 is a configuration diagram showing a heat-accumulating hot-water-supplying air conditioner 300 in Embodiment 3.

FIG. 9 is a configuration diagram showing a heat-accumulating hot-water-supplying air conditioner 300 according to Embodiment 3. Points that are different from Embodiment 1 will be described. The structure of the heat pump mechanism 2 of the heat-accumulating hot-water-supplying air conditioner 100 and the structure of the heat pump mechanism of the heat-accumulating hot-water-supplying air conditioner 300 are different. Hence, the heat pump mechanism of the heat-accumulating hot-water-supplying air conditioner 300 is renumbered as a heat pump mechanism 2-1.

(Heating-Only First Supply Heat Exchanger 11, Cooling-Only Second Supply Heat Exchanger 32)

In Embodiment 1 described above, the first supply heat exchanger 11 is a heat exchanger to heat or cool the second heat medium 10 by heat exchange with the first heat medium 3. In contrast to this, in the heat-accumulating hot-water-supplying air conditioner 300 of Embodiment 3, the first supply heat exchanger 11 is a "heat exchanger which only heats a second heat medium 10" by heat exchange with a first heat medium 3. Independently of the first supply heat exchanger 11, the heat-accumulating hot-water-supplying air conditioner 300 is provided with the "second supply heat exchanger 32 which only cools the second heat medium 10" by heat exchange with the first heat medium 3.

The heat pump mechanism 2-1 is provided with a first supply heat exchanger bypass channel 33 (indicated by a broken line in FIG. 9), a second supply heat exchanger 34 (indicated by a dotted line in FIG. 9), and circulation switching valves 6a, 6b, and 6c, in addition to a heat pump circulation channel 4, a circulation switching valve 6, a compressor 5, and an expansion valve 7. The first supply heat exchanger bypass channel 33 prevents the first heat medium 3 from circulating to the first supply heat exchanger 11. The second supply heat exchanger circulation channel 34 circulates the first heat medium 3 to the second supply heat exchanger 32. Each of the circulation switching valves 6a, 6b, and 6c is provided at a branching or joining portion with respect to the heat pump circulation channel 4, and variously changes the channel along which the first heat medium 3 circulates. Note that the circulation switching valves 6a and 6b are four-way valves, and that the circulation switching valve 6c is a three-way valve. Naturally, if the number of the valves and the number of channels (the first supply heat exchanger bypass channel 33, the second supply heat exchanger circulation channel 34) are not limited, similar switching is possible by other combinations of valves and channels.

(A Mode)

Figure 10:
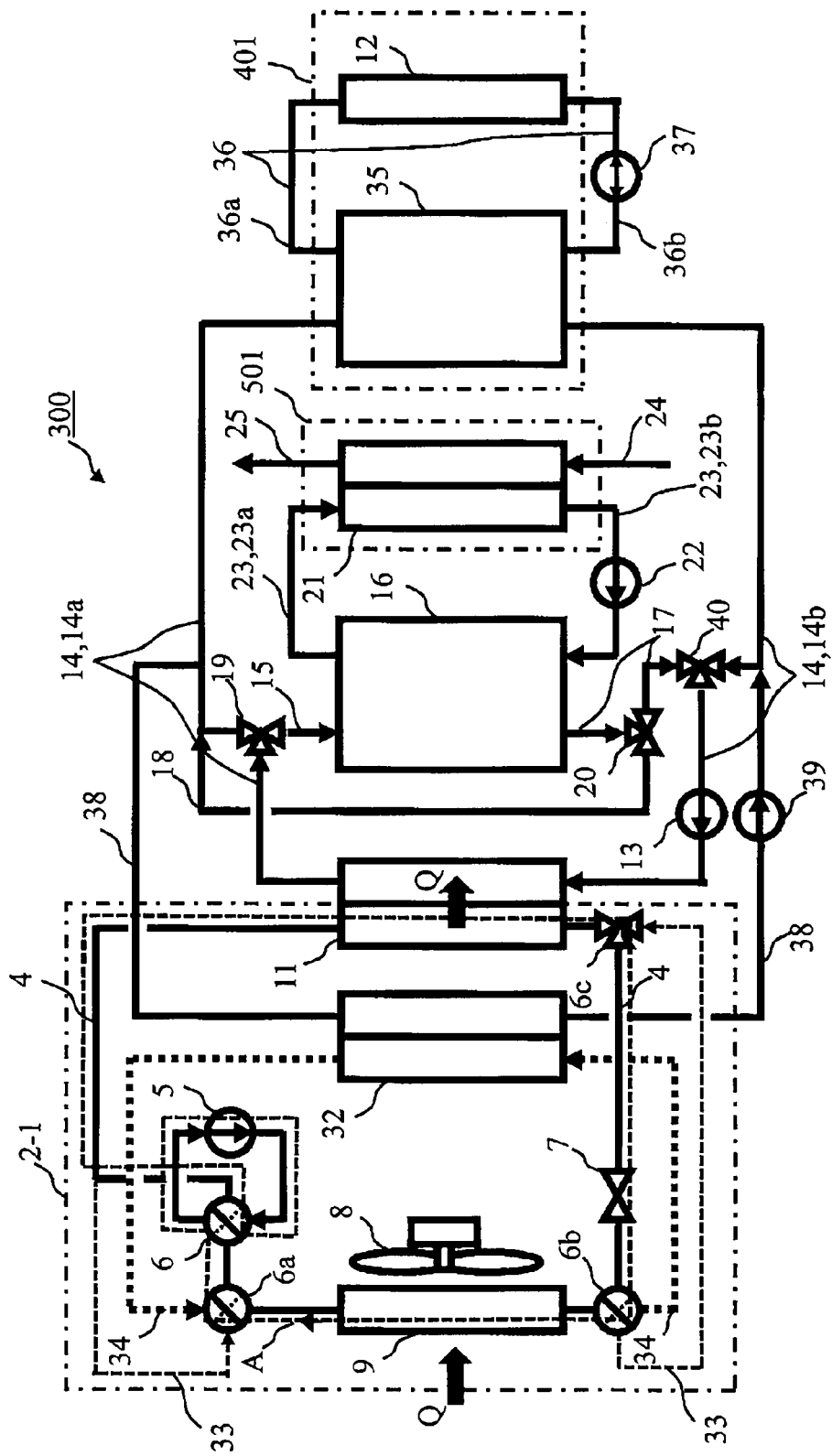
FIG. 10 is a diagram showing the flow of a first heat medium 3 of a heat pump mechanism 2-1 of A Mode in Embodiment 3.

FIG. 10 is a diagram showing the flow of the first heat medium 3 in the first mode (to be referred to as A mode hereinafter) of the heat pump mechanism 2-1. In FIG. 10, a broken line A indicates the flow of the first heat medium 3 in the A mode. In the heat pump mechanism 2-1, the first heat medium 3 can be circulated in various manners (A to C modes). For example, according to the A mode, the first heat medium 3 is circulated in a channel (broken line A) extending from the outdoor air heat exchanger 9 and returning to the outdoor air heat exchanger 9 through the circulation switching valve 6a, the circulation switching valve 6, the compressor 5, the circulation switching valve 6, the first supply heat exchanger 11, the circulation switching valve 6c, the expansion valve 7, and the circulation switching valve 6b. Then, heat is absorbed from the outdoor air by the outdoor air heat exchanger 9 and dissipated in the first supply heat exchanger 11, thus heating the second heat medium 10 in the first supply heat exchanger 11. In this case, circulation takes place along the heat pump circulation channel 4 in a manner similar to that of Embodiment 1. When the circulating direction of the first heat medium 3 is reversed by the circulation switching valve 6, heat may be dissipated to the outdoor by the outdoor air heat exchanger 9 and absorbed by the first supply heat exchanger 11, thus cooling the second heat medium 10 in the first supply heat exchanger 11. In Embodiment 3, however, such operation is not expected except for the defrosting operation for the exterior of the outdoor air heat exchanger 9.

(B Mode)

Figure 11:
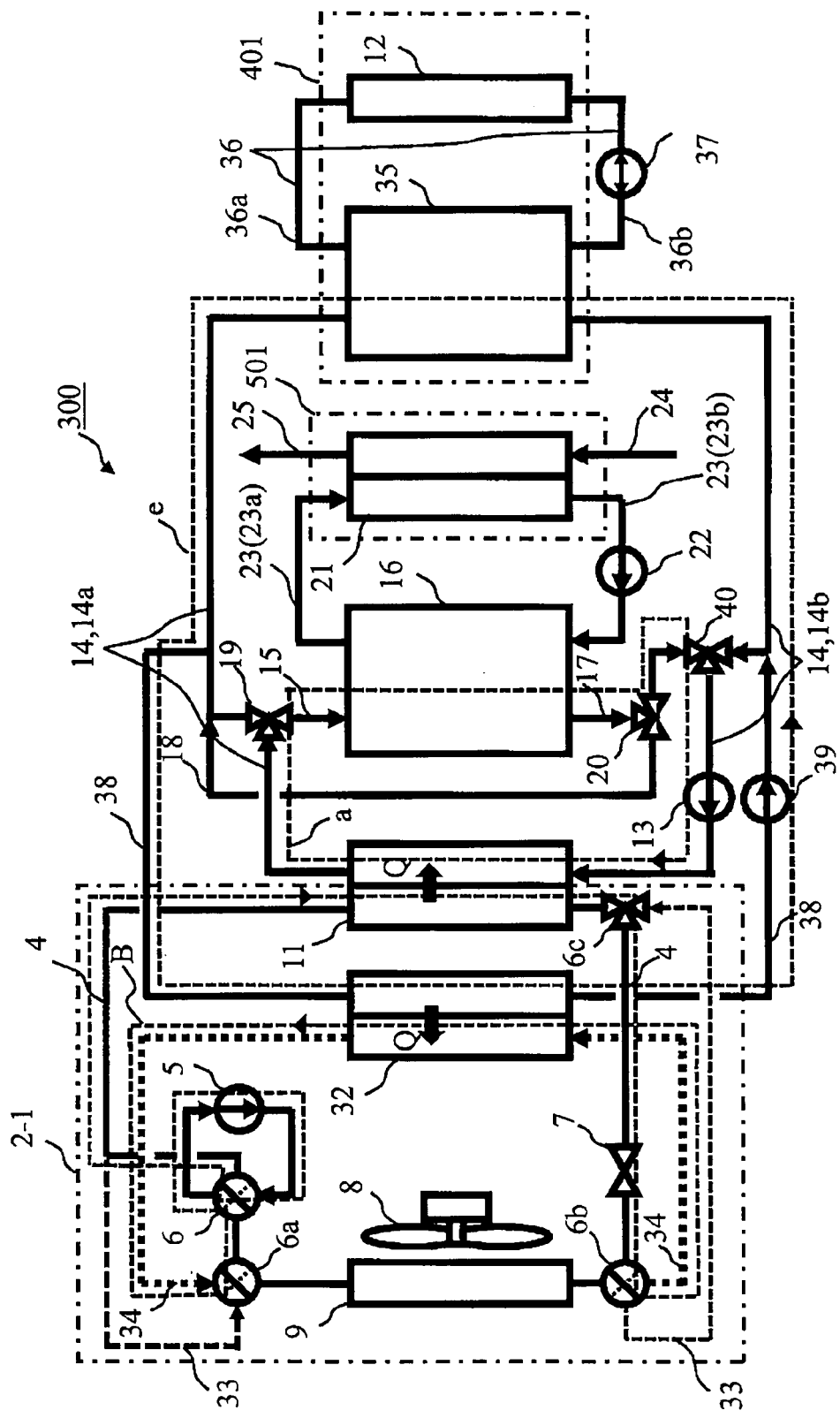
FIG. 11 is a diagram showing the flow of the first heat medium 3 of the heat pump mechanism 2-1 of B Mode in Embodiment 3.

FIG. 11 is a diagram showing the flow of the first heat medium 3 in the second mode (to be referred to as B mode hereinafter) of the heat pump mechanism 2-1. In FIG. 11, a broken line B indicates the flow of the first heat medium 3 in the B mode. The first heat medium 3 is circulated in a channel (broken line B) extending from the second supply heat exchanger 32 and returning to the second supply heat exchanger 32 through the second supply heat exchanger circulation channel 34, the circulation switching valve 6a, the circulation switching valve 6, the compressor 5, the circulation switching valve 6, the first supply heat exchanger 11, the circulation switching valve 6c, the expansion valve 7, the circulation switching valve 6b, and the second supply heat exchanger circulation channel 34. Then, heat is absorbed from the second heat medium 10 in the second supply heat exchanger 32 and dissipated to the second heat medium 10 in the first supply heat exchanger 11, thus heating the second heat medium 10 in the first supply heat exchanger 11 and cooling the second heat medium 10 in the second supply heat exchanger 32 simultaneously. When the circulating direction of the first heat medium 3 is reversed by the circulation switching valve 6, the second heat medium 10 in the first supply heat exchanger 11 may be cooled and the second heat medium 10 in the second supply heat exchanger 32 may be heated simultaneously. In Embodiment 3, however, such operation is not expected.

(C Mode)

Figure 12:
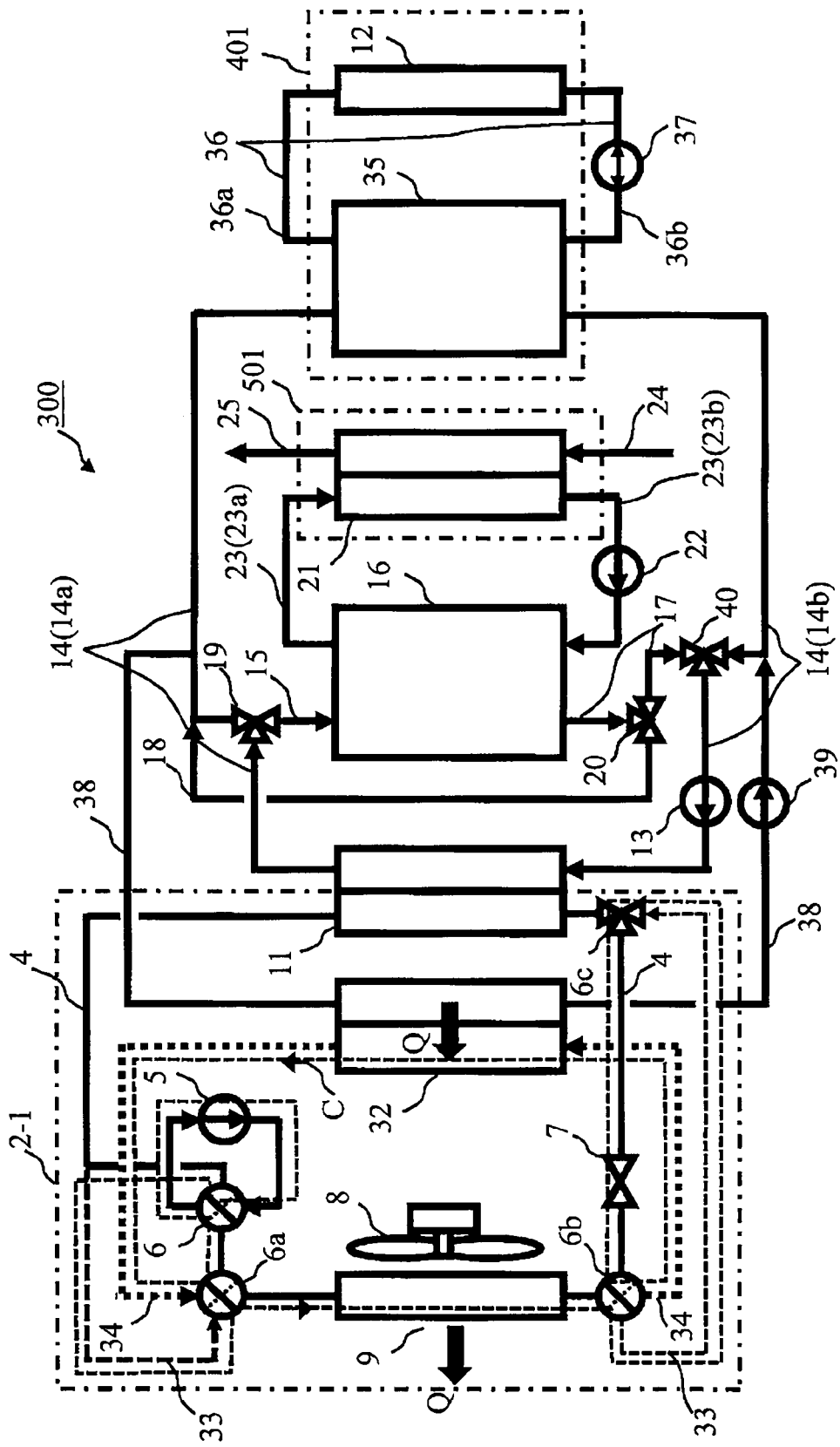
FIG. 12 is a diagram showing the flow of the first heat medium 3 of the heat pump mechanism 2-1 of C Mode in Embodiment 3.

FIG. 12 is a diagram showing the flow of the first heat medium 3 in the third mode (to be referred to as C mode hereinafter) of the heat pump mechanism 2-1. In FIG. 12, a broken line C indicates the flow of the first heat medium 3 in the C mode. According to the C mode, the first heat medium 3 is circulated in a channel (broken line C) extending from the second supply heat exchanger 32 and returning to the second supply heat exchanger 32 through the second supply heat exchanger circulation channel 34, the circulation switching valve 6a, the circulation switching valve 6, the compressor 5, the circulation switching valve 6, the first supply heat exchanger bypass channel 33, the circulation switching valve 6a, the outdoor air heat exchanger 9, the circulation switching vale 6b, the first supply heat exchanger bypass channel 33, the circulation switching valve 6c, the expansion valve 7, the circulation switching valve 6b, and the second supply heat exchanger circulation channel 34. Then, heat is absorbed from the second heat medium 10 in the second supply heat exchanger 32 and dissipated by the outdoor air heat exchanger 9, thus cooling the second heat medium 10 in the second supply heat exchanger 32. When the circulating direction of the first heat medium 3 is reversed by the circulation switching valve 6, heat may be absorbed from the outdoor air by the outdoor air heat exchanger 9 and dissipated by the second supply heat exchanger 32, thus heating the second heat medium 10 in the second supply heat exchanger 32. In Embodiment 3, however, such operation is not expected.

(First Heat Demand Part 401)

In the heat-accumulating hot-water-supplying air conditioner 300, as shown in FIG. 9, a first heat demand part 401 is provided with a second heat accumulation tank 35 with an upper portion to which a forward route 14a of the first circulation channel is connected and a lower portion to which a return route 14b of the first circulation channel is connected. In the first heat demand part 401, a third circulation channel 36 connects an air-conditioning heat exchanger 12 and the second heat accumulation tank 35 to each other, and the second heat medium 10 of the second heat accumulation tank 35 can be circulated to and from the air-conditioning heat exchanger 12 by a third pump 37. A forward route 36a of the third circulation channel is connected to the upper portion of the second heat accumulation tank 35, and a return route 36b of the third circulation channel is connected to the lower portion of the second heat accumulation tank 35. The third pump 37 is provided to the return route 36b of the third circulation channel. The second heat medium 10 is supplied from the upper portion of the second heat accumulation tank 35 to the air-conditioning heat exchanger 12, and is returned from the air-conditioning heat exchanger 12 to the lower portion of the second heat accumulation tank 35.

(Bypass Channel 38)

The heat-accumulating hot-water-supplying air conditioner 300 is provided with a bypass channel 38. The bypass channel 38 branches from the forward route 14a of the first circulation channel, at a portion between the second heat accumulation tank 35 and a branching portion to a supply channel 15. The bypass channel 38 then joins the return route 14b of the first circulation channel, at a portion between the second heat accumulation tank 35 and the joining portion of the discharge channel 17, to bypass the first supply heat exchanger 11, the first pump 13, and the first heat accumulation tank 16. The bypass channel 38 is provided with the second supply heat exchanger 32 and a fourth pump 39. Via the bypass channel 38 and a channel portion of the first circulation channel 14 excluding the portion bypassed by the bypass channel 38, the second heat medium 10 cooled by the second supply heat exchanger 32 through heat exchange with the first heat medium 3 cooled by the heat pump mechanism 2-1 is supplied to the second heat accumulation tank 35 (in the case of FIG. 11 or 12). The joining portion of the discharge channel 17 and return route 14b of the first circulation channel is provided with a bypass switching valve 40 serving as the fourth switching portion. The bypass switching valve 40 is a three-way valve which can change (adjust) the communication amount of the second heat medium 10 circulating from the discharge channel 17 to the first supply heat exchanger 11, and the communication amount of the second heat medium 10 circulating from the first heat demand part 401 to the first supply heat exchanger 11. Assume that the bypass switching valve 40 is switched to allow communication from the discharge channel 17 to the first supply heat exchanger 11. The second heat medium 10 can no longer communicate from the first heat demand part 401 to the first supply heat exchanger 11, and simultaneously the second heat medium 10 can communicate between the first heat demand part 401 and the second supply heat exchanger 32 via the bypass channel 38. More specifically, by using the bypass switching valve 40, the second heat medium 10 can be circulated between the first heat accumulation tank 16 and the first supply heat exchanger 11 by the first pump 13 (the channel of a broken line a shown in FIG. 11), and simultaneously the second heat medium 10 can be circulated between the first heat demand part 401 and the second supply heat exchanger 32 by the fourth pump 39 (the channel of a broken line e shown in FIG. 11).

The operation will be described hereinafter.

(Room Heating Operation: A Mode)

A case of room heating operation by the air-conditioning heat exchanger 12 will be described. For example, assume the case of the A mode of FIG. 10. An explanation will be made with reference to FIG. 10. When room heating operation is to be performed by the air-conditioning heat exchanger 12, the hot heat is transferred by the second heat medium 10 to the first heat demand part 401 from the first supply heat exchanger 11 connected by a first circulation channel 14, and if heat accumulating operation is also performed simultaneously, via a first heat accumulation tank 16 and a return channel 18 (FIG. 3). This is the same as in Embodiment 1. In Embodiment 3, however, the second heat medium 10 does not directly circulate between the first supply heat exchanger 11 and the air-conditioning heat exchanger 12 which is the first heat demand part 401 of Embodiment 1.

Rather, the hot heat is circulated and supplied to the second heat accumulation tank 35 by the second heat medium 10 once, and supplied to the air-conditioning heat exchanger 12 from the second heat accumulation tank 35 via the third circulation channel 36 and the third pump 37. Hence, the heat quantity required for supplying hot water to a hot-water-supplying heat exchanger 21 by the first heat accumulation tank 16 and the heat quantity required when accumulating heat from the first supply heat exchanger 11 to the first heat accumulation tank 16 are separated. Similarly, the heat quantity required for room heating and supplied to the air-conditioning heat exchanger 12 from the second heat accumulation tank 35, and the heat quantity required when accumulating heat in the second heat accumulation tank 35 via the first supply heat exchanger 11, or the first heat accumulation tank 16 and the return channel 18 are completely separated. Note that during the room heating operation, that is, in Embodiment 3, during the heat accumulating operation for the second heat accumulation tank 35 or the hot heat accumulating operation for the first heat accumulation tank 16, the heat pump mechanism 2-1 transports heat from the outdoor air heat exchanger 9 to the first supply heat exchanger 11 using the first heat medium 3 (A-mode operation).

(Room Cooling Operation)

A case of room cooling operation by the air-conditioning heat exchanger 12 will be described. For example, this corresponds to the B mode of FIG. 11 and the C mode of FIG. 12. When room cooling operation is performed by the air-conditioning heat exchanger 12, cold heat from the second supply heat exchanger 32 is supplied to the second heat accumulation tank 35 by the second heat medium 10 via the bypass channel 38 and a channel portion of the first circulation channel 14 excluding the portion bypassed by the bypass channel 38 (the channel of the broken line e). In the case of hot heat, the second heat medium 10 is supplied to the upper portion of the second heat accumulation tank 35. In contrast to this, in the case of cold heat, the second heat medium 10 is supplied to the lower portion of the second heat accumulation tank 35. Then, both in the case of hot heat and the case of cold heat, a high-temperature portion that tends to stay in the upper portion of the second heat accumulation tank 35 and a low-temperature portion that tends to stay in the lower portion of the second heat accumulation tank 35 will form separate layers, so that the accumulated heat can be used effectively. Also, the rotating direction of the third pump 37 is reversed into a direction opposite to that for the room heating operation, so the low-temperature second heat medium 10 flows out to the third circulation channel 36 from the lower portion of the second heat accumulation tank 35. The low-temperature second heat medium 10 is supplied to the air-conditioning heat exchanger 12 and returned to the upper portion of the second heat accumulation tank 35, so that the cold heat supplied to the air-conditioning heat exchanger 12 cools the interior of the room. At this time, in the heat pump mechanism 2-1, during the room cooling operation by the air-conditioning heat exchanger 12, that is, in Embodiment 3, during the operation of accumulating cold heat in the second heat accumulation tank 35, if the operation of accumulating hot heat in the first heat accumulation tank 16 need not be performed simultaneously, the heat pump mechanism 2-1 can perform an operation of transporting heat from the first supply heat exchanger 11 to the outdoor air heat exchanger 9 by means of the first heat medium 3 (C-mode operation). If the operation of accumulating hot heat in the first heat accumulation tank 16 is needed simultaneously, the heat pump mechanism 2-1 can perform an operation of transporting the heat from the second supply heat exchanger 32 to the first supply heat exchanger 11 by means of the first heat medium 3 (B-mode operation).

The heat-accumulating hot-water-supplying air conditioner 300 described above provides the following effects in addition to the same effects as those of Embodiment 1. In Embodiment 1, room cooling operation by the air-conditioning heat exchanger 12 and heat accumulating operation for the first heat accumulation tank 16 cannot be performed simultaneously. Regarding this, in the heat-accumulating hot-water-supplying air conditioner 300, one heat pump mechanism 2-1 enables hot heat accumulation in the first heat accumulation tank 16 and cold heat supply (room cooling) to the first heat demand part 401 simultaneously with different temperatures and heat quantities. Particularly, when simultaneous operations are to be performed, hot heat and cold heat can be generated by one heat pump mechanism 2-1 simultaneously. As a result, the heat pump mechanism 2-1 can be operated highly efficiently. Heat absorption/dissipation with respect to the outside (outdoor air) decreases when operating the heat pump mechanism 2-1. This suppresses external (outdoor air) temperature fluctuation, thus reducing influences to the ambient environment.

The second heat accumulation tank 35, as well as the third circulation channel 36 and third pump 37 which circulate the second heat medium 10 between the second heat accumulation tank 35 and air-conditioning heat exchanger 12 are provided as the first heat demand part 401. Hence, the second heat accumulation tank 35 can accumulate heat for room heating/cooling, and the room heating or cooling load required of the air-conditioning heat exchanger 12 and the load of accumulating heat in the second heat accumulation tank 35 can be separated. This enables stable operation of the heat pump mechanism 2-1, so inefficient operation due to load fluctuation can be avoided. In particular, during the operation of accumulating hot heat in the first heat accumulation tank 16 with no room cooling operation being performed by the air-conditioning heat exchanger 12 as well, cold heat can be accumulated in the second heat accumulation tank 35 to serve for later room cooling demand. Since hot heat and cold heat can be generated simultaneously, the highly efficient operation of the heat pump mechanism 2-1 can be performed more frequently.

Modification of Embodiment 3

In Embodiment 3, the rotating direction of the third pump 37 is reversed between the room cooling operation and the room heating operation, so the circulating direction of the second heat medium 10 along the third circulation channel 36 is reversed. Alternatively, a switching valve, and a pipe similar to the pipe between the switching valve 6 and compressor 5 of the heat pump mechanism 2-1 may be provided, in order to reverse the circulating direction of the second heat medium 10. Also, a pipe extending from the forward route to the return route of the third circulation channel 36, and a pipe extending from the return route to the forward route of the third circulation channel 36 may be formed such that the two pipes cross each other, and a switching valve may be provided. In this case, the direction of supplying the second heat medium 10 to the air-conditioning heat exchanger 12 need not be changed between the room cooling operation and the room heating operation.

In Embodiment 3, the first heat demand part 401 includes the second heat accumulation tank 35, the third circulation channel 36, the third pump 37, and the air-conditioning heat exchanger 12 provided along the third circulation channel 36. Alternatively, the air-conditioning heat exchanger 12 may be directly connected to the first circulation channel 14, in the same manner as in Embodiment 1. In this case, the effect of uniforming the load during the room cooling operation and room heating operation, which effect being obtained by the provision of the second heat accumulation tank 35, and the effect of improving the efficiency of the heat pump mechanism, which effect being obtained by simultaneously performing the operation of accumulating hot heat in the first heat accumulation tank 16 and the operation of accumulating cold heat in the second heat accumulation tank 35, cannot be achieved. Other effects, however, can be obtained in the same manner as in Embodiment 1. For example, the efficiency of the heat pump mechanism can be improved by simultaneously performing the operation of accumulating hot heat in the first heat accumulation tank 16 and the room cooling operation by supplying cold heat to the air-conditioning heat exchanger 12.

(Bypass Switching Valve 40)

In Embodiment 3, the fourth switching portion includes the three-way bypass switching valve 40 provided at the joining portion of the discharge channel 17 and the return route 14b of the first circulation channel. Alternatively, the fourth switching portion can be a three-way valve provided at the joining portion of the bypass channel 38 and the return route 14b of the first circulation channel, or a three-way valve provided at the branching portion of the forward route 14a of the first circulation channel to the bypass channel 38. The fourth switching portion need not be a three-way valve like the bypass switching valve 40, but may be constituted by a plurality of on/off valves provided before and after the joining and branching portions of the bypass channel 38 and the first circulation channel 14.

Modification of Embodiment 1

Inversely, in Embodiment 1, the second heat accumulation tank 35, the third circulation channel 36, the third pump 37, and the air-conditioning heat exchanger 12 on the third circulation channel 36 may be provided. Since cold heat generation and hot heat generation cannot be performed simultaneously in Embodiment 1, the effect of improving the efficiency of the heat pump mechanism, which effect being obtained by simultaneously performing the operation of accumulating hot heat in the first heat accumulation tank 16 and the operation of accumulating cold heat in the second heat accumulation tank 35, cannot be achieved. However, the effect which is obtained by the provision of the second heat accumulation tank 35 and uniforms the load during the room cooling operation and room heating operation can be achieved.

Modification of Each Embodiment

In each embodiment, a "latent heat accumulating body" may be formed by hermetically accommodating a "latent heat accumulating material", which solidifies and is fused within the employed temperature range of the second heat medium 10, in a container, and the "latent heat accumulating body" may be accommodated in the first or second heat accumulation tank 16 or 35 together with the second heat medium. An example of the "latent heat accumulating material" includes "paraffin, sodium acetate hydrate, and sodium thiosulfate hydrate". An example of the "latent heat accumulating body" includes "a hollow spherical or flat object containing a latent heat accumulating material". Then, the heat accumulation capacity of the first or second heat accumulation tank 16 or 35 which contains the latent heat accumulating body can be suppressed while the first or second heat accumulation tank 16 or 35 maintains a predetermined heat accumulation amount. As a result, the first or second heat accumulation tank 16 or 35 can be further downsized, and if the heat accumulation capacity is the same, the heat accumulation amount can be increased.

The above embodiments exemplify a heat-accumulating hot-water-supplying air conditioner. It is also possible to consider the operation of the heat-accumulating hot-water-supplying air conditioner, as a hot-water supplying method or heat accumulating method.

REFERENCE SIGNS LIST 2, 2-1: heat pump mechanism; 3: first heat medium; 4: heat pump circulation channel; 5: compressor; 6, 6a, 6b, 6c: circulation switching valve; 7: expansion valve; 8: fan; 9: outdoor air heat exchanger; 10: second heat medium; 11: first supply heat exchanger; 12: air-conditioning heat exchanger; 13: first pump; 14: first circulation channel; 14a: forward route of first circulation channel; 14b: return route of first circulation channel; 15: supply channel; 16: first heat accumulation tank; 17: discharge channel; 18: return channel; 19: heat accumulation switching valve; 20: exhaust heat switching valve; 21: hot-water-supplying heat exchanger; 22: second pump; 23: second circulation channel; 23a: forward route of second circulation channel; 23b: return route of second circulation channel; 24: water supply channel; 25: hot-water supply channel; 26: reheating channel; 27: reheating heat exchanger; 28: bathtub; 29: bathtub water circulation channel; 30: reheating pump; 31: reheating switching valve; 32: second supply heat exchanger; 33: first supply heat exchanger bypass channel; 34: second supply heat exchanger circulation channel; 35: second heat accumulation tank; 36: third circulation channel; 37: third pump; 38: bypass channel; 39: fourth pump; 40: bypass switching valve; 50: control unit; 55: water flow sensor; 57, 58: temperature sensor; 100, 200, 300: heat-accumulating hot-water-supplying air conditioner; 401: first heat demand part; 501: second heat demand part

The invention claimed is:
1. A heat-accumulating hot-water-supplying air conditioner comprising:
a first circulation channel including a first forward route and a first return route separate from the first forward route, the first circulation channel being configured to connect a first heat demand part which requires hot heat or cold heat, and a first supply heat exchanger which heats or cools a second heat medium through heat exchange with a first heat medium which is temperature increased or temperature decreased, with the first forward route along which the second heat medium is directed from the first supply heat exchanger to the first heat demand part, and the first return route along which the second heat medium is directed from the first heat demand part to the first supply heat exchanger;
a first heat accumulation tank which is connected to a supply channel and a discharge channel separate from the supply channel for the second heat medium, the supply channel serving to divide the second heat medium heated by the temperature increased first heat medium in the first supply heat exchanger from the first forward route of the first circulation channel, and the discharge channel for the second heat medium joining the first return route of the first circulation channel, the first heat accumulation tank being configured to accommodate the second heat medium heated in the first supply heat exchanger, via the supply channel, and into which the second heat medium supplied from the first supply heat exchanger constantly flows from the supply channel;
a first switching portion configured to change communication of the second heat medium flowing from the first supply heat exchanger and reaching the first heat demand part and communication of the second heat medium flowing from the first forward route of the first circulation channel and branching to the supply channel; and
a second circulation channel including a second forward route and a second return route separate from the second forward route, the second circulation channel being configured to allow circulation independently of the first circulation channel, and to connect the first heat accumulation tank and a second heat demand part which requires hot heat, with the second forward route along which the second heat medium is directed from the first heat accumulation tank to the second heat demand part, and the second return route along which the second heat medium is directed from the second heat demand part to the first heat accumulation tank, the second forward route branching from the supply channel or being directly coupled to the first heat accumulation tank on a side where the supply channel is connected, the second return route joining the discharge channel or being directly coupled to the first heat accumulation tank on a side where the discharge channel is connected, wherein the second heat demand part includes:
a hot-water-supplying heat exchanger which exchanges heat between the second heat medium and directly supplied water for hot water supply, thereby heating the water, the second heat medium having flowed out of the first heat accumulation tank via the second forward route of the second circulation channel, and
wherein the hot water supply is not stored in the air conditioner.

2. The heat-accumulating hot-water-supplying air conditioner according to claim 1,
wherein the first switching portion is to adjust a communication amount of the second heat medium flowing from the first supply heat exchanger and reaching the first heat demand part and a communication amount of the second heat medium communicating from the first forward route of the first circulation channel to the supply channel.

3. The heat-accumulating hot-water-supplying air conditioner according to claim 1, further comprising:
a return channel extending from a mid point of the discharge channel of the first heat accumulation tank and connected to the first forward route of the first circulation channel after a branching portion to the supply channel; and
a second switching portion configured to change communication of the second heat medium communicating through the first return route and communication of the second heat medium flowing from the first heat accumulation tank and joining the first return route of the first circulation channel via the discharge channel.

4. The heat-accumulating hot-water-supplying air conditioner according to claim 3,
wherein the second switching portion is to adjust a communication amount of the second heat medium communicating through the return channel and a communication amount of the second heat medium flowing from the first heat accumulation tank and joining the first forward route of the first circulation channel via the discharge channel.

5. The heat-accumulating hot-water-supplying air conditioner according to claim 1,
wherein the second heat demand part further includes:
a reheating heat exchanger provided midway along a branching channel branching from the second forward route of the second circulation channel and joining the second return route of the second circulation channel, and configured to exchange heat between the second heat medium communicating through the branching channel, and bathtub water circulating between a bathtub and the reheating heat exchanger during reheating, thereby heating the bathtub water; and
a third switching portion to adjust a communication amount of the second heat medium directed to the hot-water-supplying heat exchanger and a communication amount of the second heat medium directed to the reheating heat exchanger.

6. The heat-accumulating hot-water-supplying air conditioner according to claim 1,
wherein the first heat demand part includes:
a second heat accumulation tank to which the first forward route of the first circulation channel and the first return route of the first circulation channel are connected and which is configured to accommodate the second heat medium;
a third circulation channel which is provided to allow circulation independently of the first circulation channel and through which the second heat medium of the second heat accumulation tank circulates; and
an air-conditioning heat exchanger provided midway along the third circulation channel and configured to exchange heat between air and the second heat medium circulating through the third circulation channel, thereby heating or cooling the air.

7. The heat-accumulating hot-water-supplying air conditioner according to claim 1, further comprising:
a bypass channel branching from the first forward route of the first circulation channel after a branching portion to the supply channel, and joining the first return route of the first circulation channel before a joining portion to the discharge channel, thereby bypassing at least part of the second heat medium flowing through the first circulation channel, from the first supply heat exchanger;
a second supply heat exchanger provided midway along the bypass channel and configured to cool the second heat medium communicating through the bypass channel by exchanging heat with the first heat medium which is temperature decreased; and
a fourth switching portion configured to change a communication amount of the second heat medium communicating between the first supply heat exchanger and the first heat demand part and a communication amount of the second heat medium communicating between the second supply heat exchanger and the first heat demand part.

8. The heat-accumulating hot-water-supplying air conditioner according to claim 1,
wherein the second heat medium to be communicated through the second circulation channel is set to have a temperature higher than the temperature of the second heat medium to be communicated through the first circulation channel.

9. The heat-accumulating hot-water-supplying air conditioner according to claim 1,
wherein when the second heat medium is accumulated in the first heat accumulation tank as hot heat, the second heat medium is circulated from the first supply heat exchanger to the first heat demand part as either one of cold heat and hot heat via the first circulation channel, independently of circulating the second heat medium serving as hot heat from the first heat accumulation tank to the second heat demand part via the second circulation channel.

10. The heat-accumulating hot-water-supplying air conditioner according to claim 1, wherein the second heat medium is not water.

11. The heat-accumulating hot-water-supplying air conditioner according to claim 1, wherein the second heat medium is an antifreeze solution.

12. A heat-accumulating hot-water-supplying air conditioner comprising:
a first circulation channel including a first forward route and a first return route separate from the first forward route, the first circulation channel being configured to connect a first heat demand part which requires hot heat or cold heat, and a first supply heat exchanger which heats or cools a second heat medium through heat exchange with a first heat medium which is temperature increased or temperature decreased, with the first forward route along which the second heat medium is directed from the first supply heat exchanger to the first heat demand part, and the first return route along which the second heat medium is directed from the first heat demand part to the first supply heat exchanger;

a first heat accumulation tank which is connected to a supply channel and a discharge channel separate from the supply channel for the second heat medium, the supply channel serving to divide the second heat medium heated by the temperature increased first heat medium in the first supply heat exchanger from the first forward route of the first circulation channel, and the discharge channel for the second heat medium joining the first return route of the first circulation channel, the first heat accumulation tank being configured to accommodate the second heat medium heated in the first supply heat exchanger, via the supply channel, and into which the second heat medium supplied from the first supply heat exchanger constantly flows from the supply channel;

a first switching portion configured to change communication of the second heat medium flowing from the first supply heat exchanger and reaching the first heat demand part and communication of the second heat medium flowing from the first forward route of the first circulation channel and branching to the supply channel;

a second circulation channel including a second forward route and a second return route separate from the second forward route, the second circulation channel being configured to allow circulation independently of the first circulation channel, and to connect the first heat accumulation tank and a second heat demand part which requires hot heat, with the second forward route along which the second heat medium is directed from the first heat accumulation tank to the second heat demand part, and the second return route along which the second heat medium is directed from the second heat demand part to the first heat accumulation tank, the second forward route branching from the supply channel or being directly coupled to the first heat accumulation tank on a side where the supply channel is connected, the second return route joining the discharge channel or being directly coupled to the first heat accumulation tank on a side where the discharge channel is connected;

a return channel extending from a mid point of the discharge channel of the first heat accumulation tank and connected to the first forward route of the first circulation channel after a branching portion to the supply channel; and a second switching portion configured to change communication of the second heat medium communicating through the first return route and communication of the second heat medium flowing from the first heat accumulation tank and joining the first return route of the first circulation channel via the discharge channel, wherein the second heat demand part includes:

a hot-water-supplying heat exchanger which exchanges heat between the second heat medium and directly supplied water for hot water supply, thereby heating the water, the second heat medium having flowed out of the first heat accumulation tank via the second forward route of the second circulation channel.

13. A heat-accumulating hot-water-supplying air conditioner comprising:

a first circulation channel including a first forward route and a first return route separate from the first forward route, the first circulation channel being configured to connect a first heat demand part which requires hot heat or cold heat, and a first supply heat exchanger which heats or cools a second heat medium through heat exchange with a first heat medium which is temperature increased or temperature decreased, with the first forward route along which the second heat medium is directed from the first supply heat exchanger to the first heat demand part, and the first return route along which the second heat medium is directed from the first heat demand part to the first supply heat exchanger;

a first heat accumulation tank which is connected to a supply channel and a discharge channel separate from the supply channel for the second heat medium, the supply channel serving to divide the second heat medium heated by the temperature increased first heat medium in the first supply heat exchanger from the first forward route of the first circulation channel, and the discharge channel for the second heat medium joining the first return route of the first circulation channel, the first heat accumulation tank being configured to accommodate the second heat medium heated in the first supply heat exchanger, via the supply channel, and into which the second heat medium supplied from the first supply heat exchanger constantly flows from the supply channel;

a first switching portion configured to change communication of the second heat medium flowing from the first supply heat exchanger and reaching the first heat demand part and communication of the second heat medium flowing from the first forward route of the first circulation channel and branching to the supply channel;

a second circulation channel including a second forward route and a second return route separate from the second forward route, the second circulation channel being configured to allow circulation independently of the first circulation channel, and to connect the first heat accumulation tank and a second heat demand part which requires hot heat, with the second forward route along which the second heat medium is directed from the first heat accumulation tank to the second heat demand part, and the second return route along which the second heat medium is directed from the second heat demand part to the first heat accumulation tank, the second forward route branching from the supply channel or being directly coupled to the first heat accumulation tank on a side where the supply channel is connected, the second return route joining the discharge channel or being directly coupled to the first heat accumulation tank on a side where the discharge channel is connected;

a bypass channel branching from the first forward route of the first circulation channel after a branching portion to the supply channel, and joining the first return route of the first circulation channel before a joining portion to the discharge channel, thereby bypassing at least part of the second heat medium flowing through the first circulation channel, from the first supply heat exchanger;

a second supply heat exchanger provided midway along the bypass channel and configured to cool the second heat medium communicating through the bypass channel by exchanging heat with the first heat medium which is temperature decreased; and a fourth switching portion configured to change a communication amount of the second heat medium communicating between the first supply heat exchanger and the first heat demand part and a communication amount of the second heat medium communicating between the second supply heat exchanger and the first heat demand part;
wherein the second heat demand part includes:
a hot-water-supplying heat exchanger which exchanges heat between the second heat medium and directly supplied water for hot water supply, thereby heating the water, the second heat medium having flowed out of the first heat accumulation tank via the second forward route of the second circulation channel.

* * * * *